US012416492B1

(12) United States Patent  
Blanton, Jr.

(10) Patent No.: US 12,416,492 B1  
(45) Date of Patent: Sep. 16, 2025

(54) AUTONOMOUS VEHICLE SENSING THROUGH VISUALLY OBSCURING VEGETATION

(71) Applicant: RENU ROBOTICS CORP., San Antonio, TX (US)

(72) Inventor: Michael Odell Blanton, Jr., San Antonio, TX (US)

(73) Assignee: RENU ROBOTICS CORP., San Antonio, TX (US)

( * ) Notice: Subject to any disclaimer, the term of this patent is extended or adjusted under 35 U.S.C. 154(b) by 111 days.

(21) Appl. No.: 18/217,431

(22) Filed: Jun. 30, 2023

Related U.S. Application Data

(63) Continuation-in-part of application No. 17/882,303, filed on Aug. 5, 2022, now Pat. No. 12,247,828, which is a continuation of application No. 17/402,269, filed on Aug. 13, 2021, now Pat. No. 12,123,702.

(51) Int. Cl.  
*G01B 11/245* (2006.01)  
*G01B 11/24* (2006.01)  
*G01D 5/353* (2006.01)  
*G02B 6/02* (2006.01)  
*G02B 6/04* (2006.01)

(52) U.S. Cl.  
CPC ........ *G01B 11/245* (2013.01); *G01B 11/2441* (2013.01); *G01D 5/35316* (2013.01); *G02B 6/02076* (2013.01); *G02B 6/04* (2013.01)

(58) Field of Classification Search  
CPC ..... B25J 11/00; B25J 19/00; B25J 9/16; B25J 9/02; B25J 13/06; A01D 34/00; A01D 34/04  
See application file for complete search history.

(56) References Cited

U.S. PATENT DOCUMENTS

| | | |
|---|---|---|
| 5,204,814 A | 4/1993 | Noonan et al. |
| 7,668,631 B2 | 2/2010 | Bernini |
| 8,958,939 B2 | 2/2015 | Einecke et al. |
| 9,026,299 B2 | 5/2015 | Johnson et al. |
| 9,137,943 B2 | 9/2015 | Einecke et al. |
| 9,173,343 B2 | 11/2015 | Bernini |
| 9,848,529 B2 | 12/2017 | Franzius et al. |
| 10,104,837 B2 | 10/2018 | Hashimoto et al. |
| 10,321,625 B2 | 6/2019 | Einecke et al. |
| 10,698,417 B2 | 6/2020 | Churavy et al. |
| 10,824,163 B2 | 11/2020 | Einecke et al. |
| 10,856,467 B2 | 12/2020 | Maggard |

(Continued)

*Primary Examiner* — Wade Miles  
*Assistant Examiner* — Zachary Joseph Wallace

(57) ABSTRACT

Disclosed are solutions for proactively sensing terrain features and obstacles in the path of an autonomous vehicle that may be otherwise visually obscured by vegetation—said proactive sensing providing a view beyond that available to the autonomous vehicle by physically removing or pushing aside said obscuring vegetation—for the purpose of mitigating the risks the autonomous vehicle might otherwise encounter while traversing said terrain that comprises the obscuring vegetation. Accordingly, various implementations disclosed herein are directed to the novel utilization of vegetation-penetrating sensors by an autonomous vehicle to assist it in peering through such vegetation to identify navigational obstacles that are otherwise obscured by said vegetation.

20 Claims, 11 Drawing Sheets

(56) References Cited

U.S. PATENT DOCUMENTS

| | | |
|---|---|---|
| 10,888,046 B2 | 1/2021 | Gorenflo et al. |
| 11,464,161 B1 * | 10/2022 | Phanco ................ A01D 75/185 |
| 2017/0108867 A1 | 4/2017 | Franzius et al. |
| 2021/0029873 A1 | 2/2021 | Yamauchi et al. |
| 2021/0059112 A1 | 3/2021 | Kim |
| 2021/0084235 A1 * | 3/2021 | Nie ....................... G01S 13/426 |
| 2021/0096574 A1 | 4/2021 | Lee et al. |
| 2021/0123742 A1 | 4/2021 | Yang et al. |
| 2021/0127569 A1 | 5/2021 | Gruhler et al. |
| 2021/0153428 A1 | 5/2021 | Mittmann et al. |
| 2021/0157327 A1 | 5/2021 | Lee et al. |
| 2022/0039313 A1 * | 2/2022 | Morrison ............. G05D 1/0223 |
| 2022/0043108 A1 * | 2/2022 | Lavian ................... G01S 7/032 |

* cited by examiner

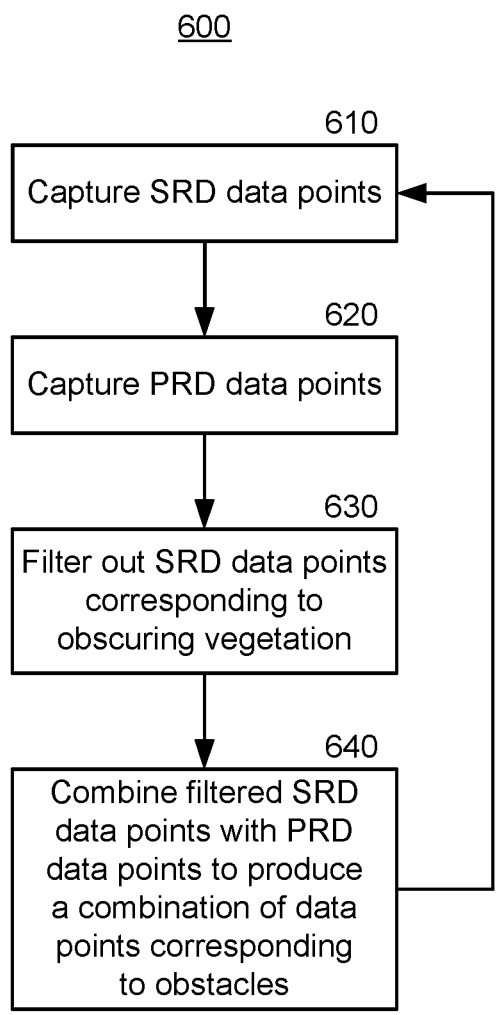

AUTONOMOUS VEHICLE SENSING THROUGH VISUALLY OBSCURING VEGETATION

CROSS-REFERENCE TO RELATED APPLICATIONS

This application is a continuation-in-part of, claims benefit of and priority to, and incorporates by reference herein in their entirety the following: pending U.S. patent application Ser. No. 17/882,303, filed Aug. 5, 2022, titled "AUTONOMOUS VEHICLE TERRAIN PREDICTION AND DETECTION", which in turn is a continuation of, and claims benefit and priority to, pending U.S. patent application Ser. No. 17/402,269, filed Aug. 13, 2021, titled "AUTONOMOUS VEHICLE TERRAIN PREDICTION AND DETECTION".

BACKGROUND

While navigating outdoors and traversing unknown, unfamiliar, or ever-changing terrain, an autonomous vehicle must be able to avoid obstacles that might otherwise impede or prevent the safe and efficient traversal of the ground over which it travels. However, natural or cultivated vegetative growth can substantially obscure terrain features and obstacles. While physically removing or pushing aside the vegetation just ahead of the autonomous vehicle is one approach for addressing this problem, it is a limited solution that in many circumstances cannot adequately protect the autonomous vehicle or the obstacle from unwanted contact, damage, or other detriment. Accordingly, there is a need for autonomous vehicles to more effectively sense obstacles that might otherwise be obscured by vegetation by peering through said vegetation.

SUMMARY

Disclosed herein are various implementations directed to proactively sensing terrain features and obstacles in the path of an autonomous vehicle that may be otherwise visually obscured by vegetation—said proactive sensing providing a view beyond that available to the autonomous vehicle by physically removing or pushing aside said obscuring vegetation—for the purpose of mitigating the risks the autonomous vehicle might otherwise encounter while traversing said terrain that comprises the obscuring vegetation and obstacles. Accordingly, various implementations disclosed herein are directed to the novel utilization of vegetation-penetrating sensors by an autonomous vehicle to assist it in peering through such vegetation to identify navigational obstacles that are otherwise obscured by said vegetation.

More specifically, disclosed herein are various implementations directed to systems, processes, apparatuses, methods, computer-readable instructions, and other implementations for an autonomous vehicle to detect navigational obstacles visually obscured by vegetation. For these various exemplary implementations, an autonomous vehicle capable of navigating an operating site may comprise: a first sensing system capable of detecting a first visual obstacle; a second sensing system capable of peering through the first visual obstacle and detecting a first navigational obstacle obscured by the first visual obstacle such that the first navigational obstacle is undetectable by the first sensing system; and a navigation system capable of directing movement of the autonomous vehicle through the first visual obstacle while avoiding the first navigational obstacle.

For several such implementations: the first sensing system may comprise at least one from among a group comprising lidar, RGB imaging, and stereo camera imaging (SCI); the second sensing system may comprise at least one from among a group comprising radar and thermal camera imaging (TCI); the second sensing system may comprise radar operating within a frequency range no greater than 7.5 GHZ; the second sensing system may comprise radar operating in a frequency range of between 3.1 GHz to 10.6 GHz; the second sensing system may comprise radar operating in a frequency range of between 3.1 GHz to 3.6 GHz; the first sensing system provides a higher detection precision than the second sensing system; the first sensing system provides a detection precision that, when measured in one dimension, is at least eight times greater than the second sensing system; the first sensing system and the second sensing system separately detect a first reference object as a reference point for determining the location of the first navigational obstacle; and/or the autonomous vehicle further may comprise a sensing processor for receiving first sensing data from the first sensing system and second sensing data from the second sensing system, and determining that the first visual obstacle is not a navigational obstacle to the autonomous vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 6 is a process flow diagram illustrating an approach by which an autonomous vehicle may detect obstacles obscured by vegetation representative of the various implementations disclosed herein;

DETAILED DESCRIPTION

Figure 1A:
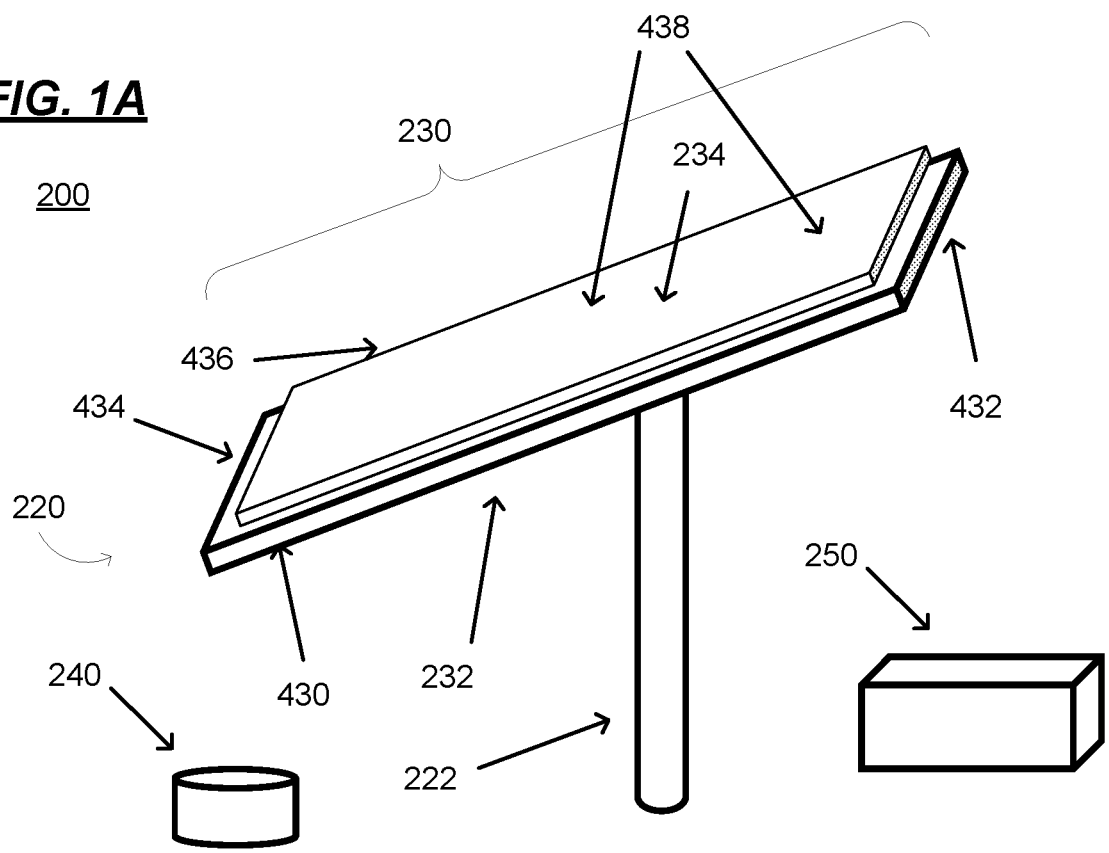
FIG. 1A is an illustration of a plurality of obstacles for detection by an autonomous vehicle representative of the various implementations disclosed herein.

Disclosed herein are various implementations directed to proactively sensing terrain features and obstacles in the path of an autonomous vehicle that may be otherwise visually obscured by vegetation—said proactive sensing providing a view beyond that available to the autonomous vehicle by physically removing or pushing aside said obscuring vegetation—for the purpose of mitigating the risks the autonomous vehicle might otherwise encounter while traversing said terrain that comprises the obscuring vegetation. Accordingly, various implementations disclosed herein are directed to the use of vegetation-penetrating sensors by an autonomous vehicle to assist it in peering through such vegetation to identify navigational obstacles that are otherwise obscured by said vegetation.

The various implementation disclosed herein may utilize, for effective navigation of the autonomous vehicle, a combination of active and passive sensors that may in turn comprise at least one surface-return detector (SRDs) such as lidar, for example, and at least one penetrating-return detector (PRDs) such as radar, for example. For these various implementations, the use of a PRD such as radar or thermal camera imaging (TCI)—which generally utilizes an infrared camera (IRC)—may be beneficial for sensing obstacles obscured by vegetation that are not detectable by SRDs. For several such implementations, both TCI and radar may be utilized together as PRDs to more effectively and completely sense, detect, and explore the area surrounding an autonomous vehicle navigating through areas having visually-obscuring vegetation under a variety of different environmental conditions. For several such implementations, SRDs such as lidar, red-green-blue cameras (RGBCs) for performing RGB imaging, and/or stereo cameras (SCs) for performing stereo-camera imaging (SCI) may still be utilized alongside PRDs to augment the detection of navigational obstacles (such as by providing a higher resolution for detected obstacles) and/or provide reference point information necessary for accurately processing and effectively utilizing the PRD data.

For convenience, radar and lidar may be used throughout as examples of PRDs and SRDs respectively. As such, any references herein to implementations comprising radar should also be considered exemplary and deemed to inherently include alternative implementations directed to other PRDs, and any references herein to implementations comprising lidar should also be considered exemplary and deemed to inherently include alternative implementations directed to other SRDs.

An understanding of various concepts is helpful to a broader and more complete understanding of the various implementations disclosed herein, and skilled artisans will readily appreciate the implications these various concepts have on the breath and depth of the various implementations herein disclosed. Certain terms used herein may also be used interchangeably with other terms used herein and such terms should be given the broadest interpretation possible unless explicitly noted otherwise.

Obstacle Detection

An autonomous vehicle representative of various implementations disclosed herein may make various measurements of the environment using radar, TCI, lidar, RGBC, SC, or another vehicle-mounted sensor (collectively, a "sensor array" or "SA") to yield data in the form of a point cloud containing the position of various points in the environment relative to the sensor (e.g. solar panel surface, solar array support structure, ground obstacles, holes and other "negative obstacles," vegetation, people, animals, fixed and movable objects, and so forth).

FIG. 1A is an illustration of a plurality of obstacles 200 for detection by an autonomous vehicle representative of the various implementations disclosed herein. In FIG. 1A, the plurality of obstacles 200 includes a solar panel assembly 220 as well as an exemplary concrete cylinder (ECC) 240 and an exemplary steel box (ECB) 250. Several such solar panels 230 (as well as ECCs 240, ECBs 250, and other obstacles) may be located on the ground of the operating environment in which the autonomous vehicle navigates. The solar panel assembly 220 further comprises a solar panel 230 fixed atop a solar panel post 222 via an orientable coupling (not shown). The solar panel 230 may further comprise a backing surface 232 and an energy capture surface 234 where the latter is purposefully highly absorbent (and minimally reflective) of electromagnetic energy generated by the sun to produce electrical power. Wires (not shown) carrying the produced electrical power from the solar panel 230 to an on-site collection/transmission facility (also not shown) may run centrally down the post 222 and underground or, although not illustrated as such, may be emplaced overhead or located in any of several other possible configurations that will be known and appreciated by skilled artisans.

Figure 1B:
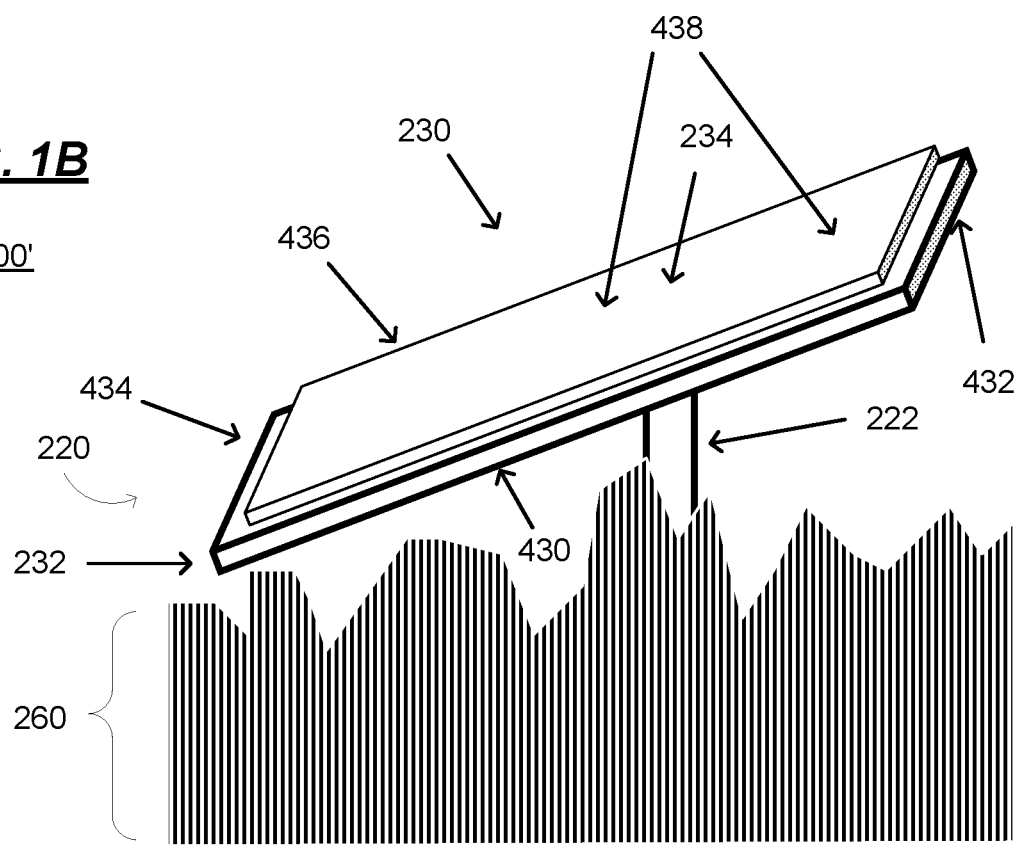
FIG. 1B is an illustration of the plurality of obstacles of FIG. 1A for detection by the autonomous vehicle representative of the various implementations disclosed herein, but wherein said obstacles are visually obscured, partially or wholly, by vegetation.

FIG. 1B is an illustration of the plurality of obstacles 200 of FIG. 1A for detection by the autonomous vehicle representative of the various implementations disclosed herein, but wherein said obstacles 200' are visually obscured, partially or wholly, by vegetation 260. Because of this vegetation 260, the ECC 240 and ECB 250 in particular are not detectable by sensors comprising one or more SRDs, and the lower portion of the solar panel post 222 is also undetectable by SRDs due to said vegetation 260.

Figure 2:
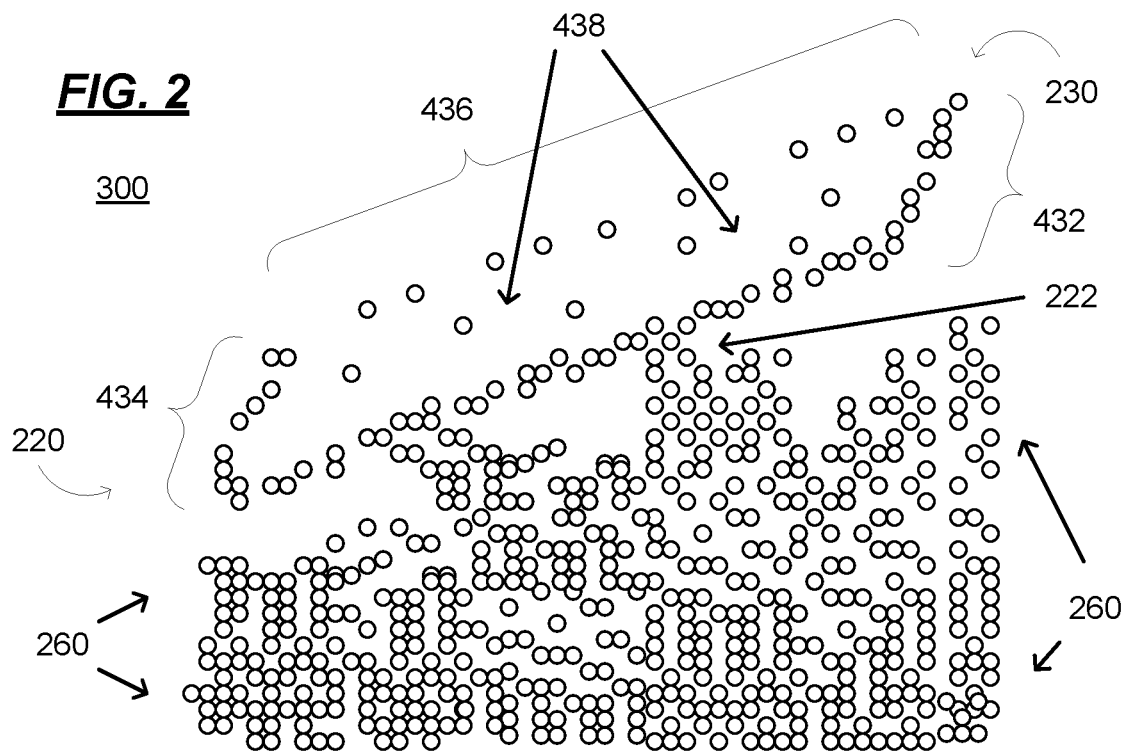
FIG. 2 is an illustration of exemplary detection of data points derived by a surface-return detector (SRD), such as lidar, utilized by the autonomous vehicle representative of the various implementations disclosed herein, said data points roughly corresponding to the visible (i.e., unobscured) obstacles and vegetation of FIG. 1B, but where the vegetation is also obscuring the lower portion of the solar panel post and the other obstacles shown in FIG. 1A.

FIG. 2 is an illustration of exemplary detection of data points 300 derived by a surface-return detector (SRD), such as lidar, utilized by the autonomous vehicle representative of the various implementations disclosed herein, said data points roughly corresponding to the visible (i.e., unobscured) portions of the obstacles 200 as well as the vegetation 260 of FIG. 1B, but where the vegetation 260 is also obscuring the lower portion of the solar panel post 222 and the other obstacles shown in FIG. 1A. More specifically, because the detection of obstacles 200' of FIG. 1A (which correspond to obstacles 200 of FIG. 1A) by SRDs is obscured by vegetation 260, the detection of data points 300 by SRDs as shown in FIG. 2 corresponding only to the solar panel 230 and the upper portion of the post 222 as well as the vegetation 260, but do not include the lower portion of the a solar panel post 222 and the ECC 240 and ECB 250 which are obscured by the data points corresponding to the vegetation 260.

Figure 3:
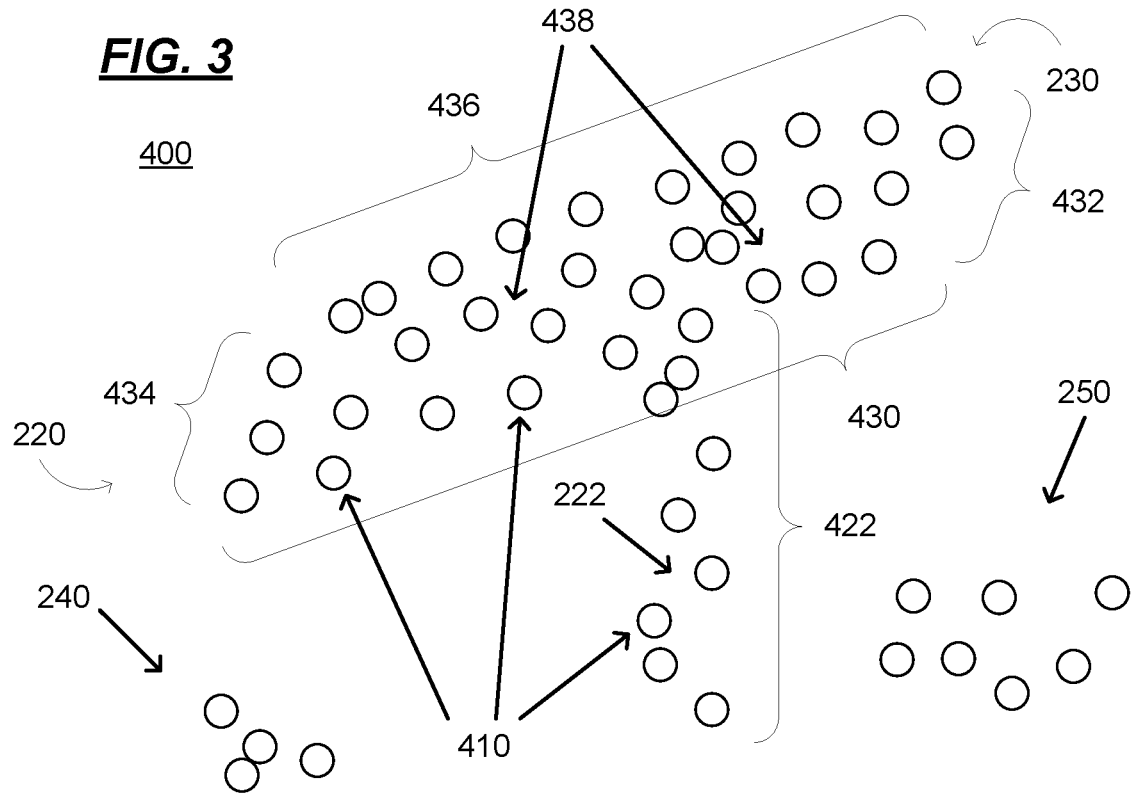
FIG. 3 is an illustration of exemplary detection of data points derived by a penetrating-return detector (PRD), such as radar, utilized by the autonomous vehicle representative of the various implementations disclosed herein, said data points roughly corresponding to the obstacles of FIG. 1A to include the solar panel and the entire post and the other obstacles of FIG. 1A by effectively peering through (and not detecting) the vegetation shown in FIG. 1B.

FIG. 3 is an illustration of exemplary detection of data points 400 derived by a penetrating-return detector (PRD), such as radar, utilized by the autonomous vehicle representative of the various implementations disclosed herein, said data points 400 roughly corresponding to the obstacles 200 of FIG. 1A to include the solar panel 230 and the entire post 222 and the other obstacles of FIG. 1A by effectively peering through (and not detecting) the vegetation 260 shown in FIG. 1B. More specifically, the detection of data points 400 by PRDs include the solar panel 230 and post 222 as well as the ECC 240 and ECB 250 because the PRDs do not detect the vegetation 260 and thus are able to effectively peer through the vegetation 260 to detect all of the obstacles 200. However, because the data points 400 produced by PRDs do not have the high resolution of data points 300 produced by SRDs, the objects 200 detected by PRDs are of a lower resolution and thus the objects 200 are represented by the larger, more widely-spaced circles 410 for the data points 400 of FIG. 3 to represent this lower resolution.

Figure 4:
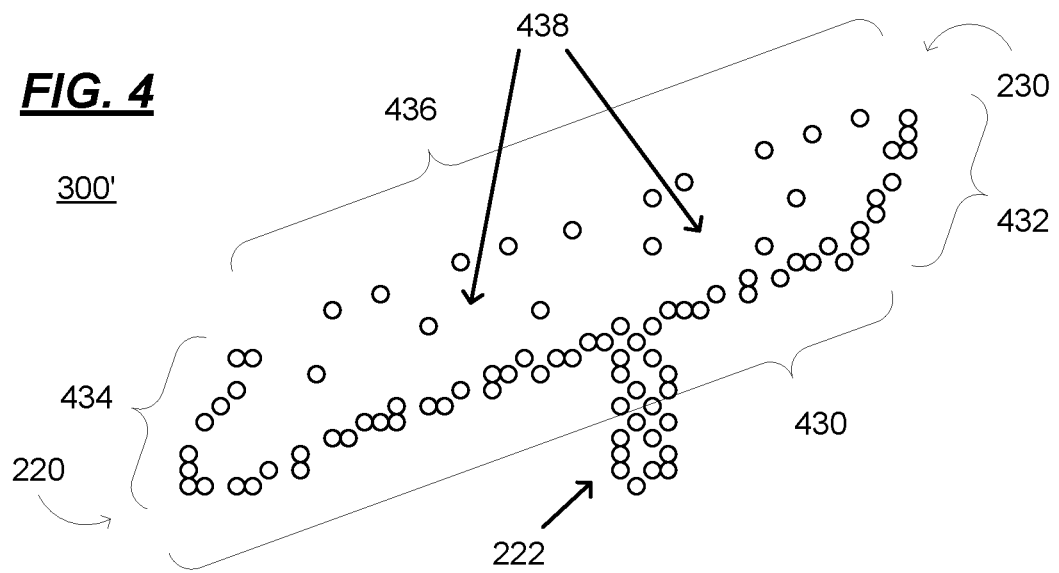
FIG. 4 is an illustration of the SRD data points of FIG. 2 after removing (filtering out) the subset of data points corresponding to the vegetation in a manner representative of various implementations disclosed herein.

FIG. 4 is an illustration of the SRD data points 300 of FIG. 2 after removing (filtering out) the subset of data points corresponding to the vegetation in a manner representative of various implementations disclosed herein. In FIG. 4, the resulting filtered SRD data points 300' may be useful as a reference point for matching up with the PRD data points 400. The vegetation identified and removed from the SRD data points 300 may be based on the PRD data points 400, for example, by determining that vegetation data points in the SRD data 300 correspond to where there is a lack of equivalent data points in the PRD data 400.

Figure 5:
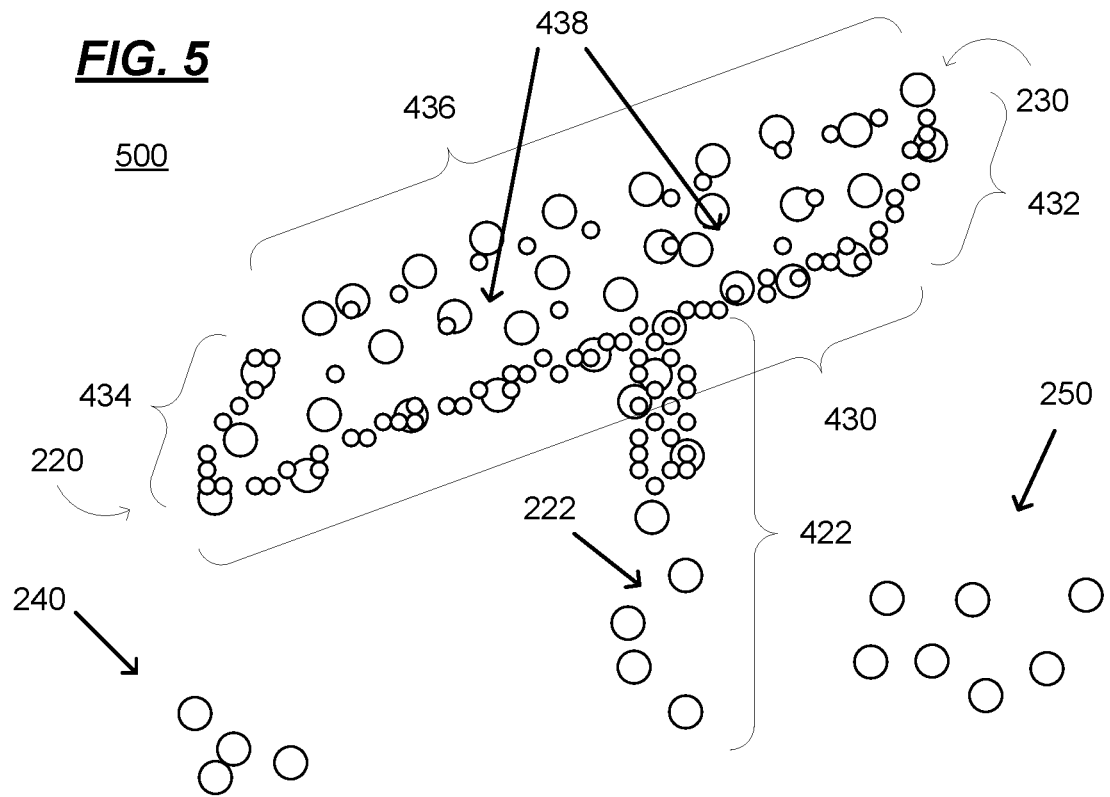
FIG. 5 is an illustration of the filtered SRD data points of FIG. 4 overlaid on the PRD data points of FIG. 3 to provide an enhanced combination of data points corresponding to the plurality of obstacles in a manner representative of the various implementations disclosed herein.

FIG. 5 is an illustration of the filtered SRD data points 300' of FIG. 4 overlaid on the PRD data points 400 of FIG. 3 to provide an enhanced combination of data points 500 corresponding to the plurality of obstacles 200 in a manner representative of the various implementations disclosed herein. In FIG. 5—and with reference to FIG. 1A, FIG. 1B, FIG. 2, FIG. 3, and FIG. 4—the SRD data points 300' (that are not obscured by vegetation 260) as well as the PRD data points 400 that together correspond to the solar panel assembly 220 will naturally coalesce around the reflective vertical component 422 and reflective angled components 430, 432, and 434 as well as a detected but substantially non-reflective surface 438 extending to a determinable outer edge 436, which makes the solar panel assembly 220 readily identifiable as well as distinguishable from other obstacles (e.g., ECC 240 and ECB 250) detected and reflected in the combination of data points 500.

FIG. 6 is a process flow diagram 600 illustrating an approach by which an autonomous vehicle may detect obstacles obscured by vegetation representative of the various implementations disclosed herein. In FIG. 6, at 610 the autonomous vehicle utilizes a sensor comprising at least one SRD to capture SRD data points, and at 620 the autonomous vehicle utilizes a sensor comprising at least PRD to capture PRD data points. At 630 the autonomous vehicle may then filter out the data points corresponding to vegetation in the SRD data points to produce filtered SRD data points, and at 640 the autonomous vehicle may then combine the filtered SRD data points with the PRD data points to produce a combination of data points corresponding to the obstacles, both visible and obscured by vegetation. This process may operate iteratively, in whole (as shown) or in part, to enable additional sensor data to be captured over time from a single location and/or as the autonomous vehicle moves as it navigates the operating site.

As described above, the various implementations disclosed herein may comprise a combination of radar, TCI, lidar, and/or RGB camera(s). Select implementations may also further comprise a red-green-blue (RGB) camera for use in capturing visual reference-point data corresponding to the corresponding data collected by the radar, lidar, and TCI. For certain implementations, the radar may operate at a frequency of 3.1 to 10.6 GHz and/or a maximum bandwidth of up to 7.5 GHZ. For certain implementations, the IR camera used for TCI may utilize a resolution of 80×60 pixels and, for select implementations that also utilize a RGB camera, and such corresponding RGB camera may have a resolution of 640×480 pixels. Similarly, for the various implementations that utilize both an RGB camera and an IR camera, the ratio of pixels between the two cameras may be 8:1 (RGB to IR) vertically and/or horizontally, and for some implementations the ratio of the total number of pixels may be 64:1 respectively (RGB to IR), largely due to the lower resolution inherent to an IR camera compared to an RGB camera.

With regard to the foregoing disclosures, it is worthwhile to note that radar generally senses larger objects more easily than smaller objects, and especially so when being utilized to penetrate through vegetation. For various implementations disclosed herein, the distance between the radar itself and the obstacles detected by said radar range from 1.5 meters (for smaller obstacles) to 4 meters (for larger obstacles), which also corresponds to what my be the implicit need in navigation of certain autonomous vehicles to detect (and react to) larger obstacles at distances greater than the distances needed to detect (and react to) smaller obstacles (because, in general, larger obstacles generally pose a greater risk to the autonomous vehicle than smaller obstacles).

Although radar can sense objects visually obscured by vegetation and measure an accurate distance to said objects, radar is generally unable to identify the type, nature, and features of the objects detected. On the other hand, TCI is able to differentiate vegetation from the ground surface due to temperature difference. As such, TCI can identify uneven terrain surfaces hidden under vegetation more effectively than an RGB camera or radar. Likewise, negative obstacles like holes and ditches can be differentiated from normal terrain more accurately via TCI.

Lidar detection, meanwhile, is largely dependent upon the size of the obstacle to be detected. With partially obscured obstacles, the size of the obstacle relative to the density of vegetation determines observability by lidar. Lidar can also observe the geometric shapes of obstacles and differentiate between large obstacles and small obstacles better than radar when visually less obstructed. Nevertheless, lidar's ability to penetrate vegetation is limited to sensing larger obstacles in thinner vegetation, but not smaller or fully-obscured obstacles in thick vegetation.

Notably, for several implementations disclosed herein, the radar may be utilized at frequencies most effective for peering through vegetation, such as operating in a frequency range of between 3.1 GHz to 10.6 GHz and/or within a frequency range no greater than 7.5 GHZ. For select implementations, the frequency range may be between 3.1 GHz to 3.6 GHz. These ranges correspond to the worldwide frequency allocations for Ultra-Wideband (UWB) and ideal ranges therewithin, although nothing in this disclosure is intended to limit the present implementations to UWB. On the contrary, certain implementations are specifically directed to the utilization of frequencies below 3.1 GHz notwithstanding any regulatory restrictions (which may be waived, changed, or perhaps inadvisably ignored even if applicable). Furthermore, for the various implementations disclosed herein, the SRD sensors may provide a higher detection precision than the PRD sensing system, and for several such implementations the detection precision of the SRD, when measured in one dimension, may be at least eight times greater than the precision of the PRD sensing system. Of course, the foregoing radar system frequency ranges may be better understood when considering the corresponding wavelength of such frequencies, and that there is benefit to utilizing radar wavelengths that are appreciably longer than the width of the vegetation's structure such that, for a blade of grass that may be a quarter inch in width, choosing a radar frequency corresponding to a wavelength of at least a few inches is beneficial. In other words, certain implementation might instead utilize radar having a longer radio wave that falls across the short dimension of the vegetation component intended to be peered through. This in turn further suggests that variable polarity radar (vertically oriented waves vs. horizontally oriented waves) would also be beneficial when utilized by certain alternative implementations, and indeed such orthogonal propagating waves for radar may be utilized when more effective in certain orientations that could be detected and adjusted real-time by the sensing system such as, for example, when the vegetation exhibits itself in different orientation angles and/or as the sensing system is moved relative to the vegetation changing the angle of orientation of the vegetation being viewed, all representative of alternative implementations herein disclosed.

Accordingly, the various implementations disclosed herein are directed to systems, processes, apparatuses, methods, computer-readable instructions, and other implementations for an autonomous vehicle to detect navigational obstacles visually obscured by vegetation. For these various exemplary implementations, an autonomous vehicle capable of navigating an operating site may comprise: a first sensing system capable of detecting a first visual obstacle; a second sensing system capable of peering through the first visual obstacle and detecting a first navigational obstacle obscured by the first visual obstacle such that the first navigational obstacle is undetectable by the first sensing system; and a navigation system capable of directing movement of the autonomous vehicle through the first visual obstacle while avoiding the first navigational obstacle.

For several such implementations: the first sensing system may comprise at least one from among a group comprising lidar, RGB imaging, and stereo camera imaging (SCI); the second sensing system may comprise at least one from among a group comprising radar and thermal camera imaging (TCI); the second sensing system may comprise radar operating within a frequency range no greater than 7.5 GHZ; the second sensing system may comprise radar operating in a frequency range of between 3.1 GHz to 10.6 GHz; the second sensing system may comprise radar operating in a frequency range of between 3.1 GHz to 3.6 GHz; the first sensing system provides a higher detection precision than the second sensing system; the first sensing system provides a detection precision that, when measured in one dimension, is at least eight times greater than the second sensing system; the first sensing system and the second sensing system separately detect a first reference object as a reference point for determining the location of the first navigational obstacle; and/or the autonomous vehicle further may comprise a sensing processor for receiving first sensing data from the first sensing system and second sensing data from the second sensing system and determining that the first visual obstacle is not a navigational obstacle to the autonomous vehicle.

Moreover, in addition to lidar, RGB imaging, and stereo camera imaging (SCI), other surface return type sensors may also be utilized in lieu of or in addition to the foregoing. Likewise, utilization of higher-frequency sensors that do not fully penetrate but only partially penetrate the surface of the vegetation—such as RGBD, structured light, ultrasonic, and thermal cameras—might also be utilized in the primary or first sensing system when effective to do so. Thus, nothing herein this disclosure is intended to limit the primary or first sensing system to just lidar, RGB imaging, and stereo camera imaging (SCI), but is intended to encompass any sensing modality that in at least certain circumstances can at least partially see through vegetation.

Sensor Arrays

As described earlier herein, an autonomous vehicle representative of various implementations disclosed herein may make various measurements of the environment using radar, TCI, lidar, RGBC, SC, or another vehicle-mounted sensor (collectively, a "sensor array" or "SA") to yield data in the form of a point cloud, for example, containing the position of various points in the environment relative to the sensor (e.g. solar panel surface, solar array support structure, ground obstacles, holes and other "negative obstacles," vegetation, people, animals, fixed and movable objects, and so forth). Although a point cloud (e.g., 3D data model) may be utilized for various implementations, alternate implementations may instead utilize a 2D data model, 4D data model, or other appropriate data model in lieu of or in addition to a 3D data model accordingly.

Single frame measurements for many sensors in the SA may not provide sufficient information to distinguish target objects (such as solar panels) from other objects in the environment, and the data from individual sensors can have large gaps between individual measurement points that are fixed relative to the sensor. However, aggregating sensor data as the vehicle moves can provide a clearer representation of the environment that can help fill in gaps in the measurements and identify obscured navigational obstacles, both from the individual sensors comprising the SA as well as the different viewpoints provided to each sensor as the autonomous vehicle moves. Moving the sensor can also provide close-up measurements of distant locations which can then be connected together via aggregation. While measurement performance can decline quickly as distance from the sensor increases, moving the sensor allows the environment to be observed from multiple locations and at a smaller distance for objects of interest toward which the autonomous vehicle can move.

For example, when the measurements are sufficiently aggregated, the points associated with solar panels can be segmented (separated) from the rest of the points. Multiple known methodologies can be used to do this, from using a simple height threshold (i.e., selecting all points above a certain height) to fitting mathematical planes to the data and removing outlying points (i.e., those that are far from the plane.) In this manner, the likelihood of misattributing points to the panels can be mitigated. In addition, removal of points associated with the ground is important to avoid mis-fitting planes to the data.

To fit the planes to the data, these mathematical planes—defined by a point on the plane and a 3D vector that is in a direction normal to the plane—can be fit to the remaining data. Random Sample Consensus (RANSAC) can then be used to find multiple distinct, non-co-planar, planes in a data set. Each plane with a minimum number of associated valid measured points, of course noting that any three points that are not all collinear can define a plane, and therefore requiring a much higher number of points are needed to ensure that the points correspond to a true approximately planar surface in the environment.

After identifying the points associated with distinct planes, the orientation of the panels can be determined based on the tilt and alignment of the panels based on the direction of the long edge using a combination of methods which might include detecting the edge directly, finding the major axis of the points associated with the panels, and/or using additional a priori data about the installed orientation of the panels. The cross-row extents of the panels are then determined by identifying the edges of the panels in the data in the cross-row direction. The a priori known size/shape of the panel sections can be used to refine these measurements. Finally, the centerline is fit to the center of the extents and aligned with the panels.

When the panels are movable and the pivot point is offset from the top surface of the panel, the centerline can be moved to the pivot based on the known geometry of the panels. Although this adjustment might only change the position estimate by a small amount, this offset may be crucial for yielding the desired positioning precision of the autonomous mower to get complete mowing coverage of the site without running into structures on the site.

Finally, the panel detection may then be used to determine the position of the autonomous mover relative to a row of solar panels. This measurement can be used in two ways: (1) it can be used to ensure that the robot maintains a safe distance from the structures; and (2) it can be used to provide a high precision measurement of lateral position (cross-row positioning) when GPS is unavailable and RTK corrections are unreliable. Therefore, by creating a map that stores the georegistered centerlines of the panels, the live measurements can be compared to the centerlines in the map and used to offset the estimated position of the vehicle on the map.

Autonomous Vehicles

Various implementations disclosed herein relate to autonomous vehicles (or "robots") such as, for example, mobile maintenance robots, autonomous mowers, or other such vehicles and devices that might be utilized for various purposes, such as, for example, maintenance operations at renewable energy installations. Even in this narrow but representative example, however, such maintenance operations may include a diverse range of activities and tasks including without limitation mowing, spraying for pests, spraying insecticides, washing of solar panels, security monitoring of the area, replacement of failed components, or other maintenance operations including but not limited to inspections of combiner boxes, wire connections, or infrastructure (including solar panels), and where any such "inspections" may be performed with multispectral cameras capturing image data within specific wavelength ranges across the electromagnetic spectrum.

For the various implementations herein disclosed, an autonomous vehicle may comprise a variety of sensors, such as (but not limited to) lidar (light detection and ranging), radar (radio detection and ranging), thermal camera imaging (TCI), and red-green-blue (RGB) camera(s), as well as an IMU (inertial measurement unit), inertial navigation systems, temperature sensors, humidity sensors, noise sensors, accelerometers, pressure sensors, GPS (global positioning system), ultrasonic sensors, cameras, or other sensors. The autonomous vehicle may implement autonomous navigation to traverse a work area using sensors for collision avoidance and adjusting routing as needed to avoid obstacles, both visible and obscured by vegetation.

The autonomous vehicle may be communicatively connected to a central management system through a GPRS (General Packet Radio Service) network or other cellular data network or cell-based radio network technology mobile network, an IEEE 802.11x wireless network or any other network modality. Any number of networks (of the same or different types) may be present and used in any combination suitable for performing any one or more of the methodologies described herein.

GPS/GNSS

Various implementations herein disclosed may utilize GPS and/or other GNSS system for navigation and to support mapping of an operation site, and several such implementations may utilize more than one such GNSS and/or make use of multi-frequency receivers that support multiple or all of the deployed GNSS constellations.

A global navigation satellite system (GNSS) is a satellite navigation system with global coverage such as, for example, the U.S. Global Positioning System (GPS). Other examples of GNSSs include Russia's Global Navigation Satellite System (GLONASS), China's BeiDou Navigation Satellite System (BDS), and the European Union's Galileo system.

GPS provides geolocation and time information to a GPS receiver anywhere on or near the Earth where there is an unobstructed line of sight to a plurality of satellites—generally requiring at least three for basic location determinations and at least four to include an altitude determination—with greater accuracy being achievable with the inclusion of additional satellites (that is, more than four satellites) when possible. Satellite-emitted GPS signals are relatively weak, however, and can be easily blocked by mountains, buildings, or other obstacles, although this can also be mitigated by the inclusion of additional satellites when possible.

High accuracy GPS/GNSS receivers can be used in many applications for high-accuracy, high-precision guidance of autonomous vehicles, and some implementations of high-accuracy GPS utilization may be supplemented by real-time kinematic (RTK) corrections. However, there are a number of common conditions that can result in degradation or complete unavailability of GPS signals when the GPS antenna's view of the sky above is blocked and a minimum number of satellites necessary for GPS positional determinations are not available. For example, such conditions can be common when operating in and around solar arrays, and particularly whenever driving underneath such arrays, where solar panels are elevated and reside atop posts having a substantially smaller footprint on the ground than the solar panels themselves. Therefore, in order to ensure continuous, reliable location determinations when GNSS measurements are lost or rendered inaccurate, other methods for localization are required.

Except where expressly stated otherwise, references made to GPS are non-limiting and are merely exemplary and representative of any and all GNSSs with no intention whatsoever to limit the disclosures herein to GPS alone but instead said references should be read as broadly as possible and inclusive of and equally applicable to any and all GNSSs. Moreover, any reference to a single GNSS system—and in particular any reference to GPS—should be deemed a reference to any GNSS individually or all GNSSs collectively.

Autonomous Mowers

While it is generally desirable to have substantial ground cover on renewable energy facilities such as solar farms and wind farms, for example, for both aesthetic reasons and to mitigate ground erosion, improper maintenance of this ground vegetation can lead to overgrowth and result in reduced energy production, unsafe working conditions, and increased fire risk. To address this need, various implementations disclosed herein are directed to autonomous vehicles that may be a mobile maintenance system or, more specifically, an autonomous mowing system ("mower") that may include one or more blades disposed below a mowing deck coupled to a tractor.

One of the challenges for this type of an operating environment and others is that navigational obstacles may be visually obscured by vegetation, and typical visual-based sensors cannot see through this vegetation to locate and identify navigational obstacles. Indeed, autonomous vehicles operating off-road can encounter many obstacles-including but not limited to holes in the ground as well as above-ground objects-which can be obscured by vegetative growth (grass, bushes, etc.). These obstacles can obstruct navigation of the autonomous vehicle or cause damage. For this reason, mapping of ground surface and the sensing of non-vegetative obstacles can greatly improve the reliability and performance of autonomous vehicles navigating in such operating environments.

Variations/Configurations

For certain implementations, the autonomous vehicle may have four wheels with two positioned forward and widely dispersed to the outsides of the tractor and provide the driving force to propel the tractor and the system, including opposing propulsive force to facilitate turning. Two additional wheels may also be utilized and disposed to the rear of the tractor and provide stability. For alternate implementations, four wheels may be disposed at the corners of the tractor where all four are modified to provide propulsive force and/or turning capabilities to the autonomous vehicle. Other alternative implementations may instead employ a different number of drive wheels or guide wheels. Moreover, for a variety of implementations, the autonomous vehicle may be a low- or zero-turn vehicle, that is, a vehicle that can achieve a small turn radius or a turn radius that is effectively zero.

The various implementation disclosed herein may operate on battery-stored electrical power for which a charging system for the autonomous vehicle is provided in any of several different configurations and having a variety of different features. For solar farm and wind farm installations, for example, the charging system may operate on electrical power produced by the farm; however, because there may be times when maintenance is required when the sun is obscured or wind calm and such power is not available—or, more commonly, when the site may not allow for utilization of the power produced by the site or when the site is not a power-producing site—several such implementations are directed to a charging system for an autonomous vehicle may be configured to rely on other power sources, may generate its own power, or may store and transport power from other locations and other sources for utilization by or replenishment of the autonomous vehicle when needed.

Although certain implementations described herein are specifically directed to mobile automated maintenance systems and related methods for facilities and installations on a large acreage where ground cover is desired to prevent soil/ground erosion, provide pleasing aesthetics, or for other reasons, and that these implementations may be discussed primarily in terms of maintenance operations at solar farms (or other renewal energy sites such as those for wind turbine farms, ash ponds, or other facilities or installations), it will be readily understood and well-appreciated by skilled artisans that the various implementations described herein have broad applicability to other utilizations and are not limited to renewable energy or power generation facilities or installations in any way whatsoever. Instead, the various implementations disclosed herein should be broadly understood to be applicable to utilizations beyond renewable energy and also should be understood as disclosing such utilizations in the broadest contexts possible consist with the disclosures made herein.

Initial Operating Site Setup

Many operating sites could benefit from the utilization of autonomous vehicles such as, for example, large outdoor areas requiring vegetation maintenance or facilities such as solar farms where unchecked vegetation growth can be a hindrance or worse. For these kinds of locations, autonomous vehicles could provide valuable services such as mowing, inspections, and site security to name a few.

However, the initial setup for an autonomous vehicle to navigate and perform tasks on an operating site can be burdensome and time-consuming, often requiring manual programming or deployment of navigational checkpoints devices. This burden increases for sites populated with natural or intentional obstacles to navigation and can be particularly challenging for well-ordered but obstacle-rich environments such as solar farms. Path development is also complicated for operating sites having dynamic obstacles that change their location or orientation from time to time, as well as sites having inherent visibility problems due to rapid growth of vegetation that can obscure obstacles and other hazards.

For these reasons initial path development can discourage the deployment of autonomous vehicles for operating sites that might otherwise significantly benefit from their utilization. As such, there is a need for solutions to the challenges of initial site setup for autonomous vehicle navigation and path development.

For site setup, two types of routes may be utilized: static routes and dynamic routes. Static routes (or, more precisely, static route segments) are those that are fixed in space, akin to lanes on a road, and are used at a site for transiting between locations for performing one or more tasks separate from or in addition to navigation (such as mowing in the context of a autonomous mower). As such, a complete route might include multiple route segments, each of which is static or pre-defined, although other parts of the routes may not be, that is, are more dynamic and thus are typically computed as-needed or real-time to get from point A to point B (somewhat akin to many GPS-based driving maps navigation applications). These dynamic routes (or, more precisely, route segments) are generated for performing the intended tasks and are incorporated into complete route.

For site setup, both types of routes are important but may be created and represented differently. For example, for certain dynamic routes—such as those where the site setup consists of identifying certain features such as rows or polygons that define the area in which the dynamic routes will be generated—these dynamic routes may be developed via any of the various implementation described herein, and for which there may be a clear analog to equivalent manual processes. The creation of the static route segments, however, may be performed differently depending on known features of the site, based on a pre-defined navigational path, or limited to only those locations where pre-defined transit paths may be required for a variety of different reasons (e.g., safety, efficiency, etc.).

For example, in the exemplary context of an autonomous mower, establishing routes at a site typically includes two main tasks: locating and defining mowing areas, and creating transit paths around a site to facilitate movement to and from mowing areas and to and from docking locations. Mowing areas can be defined in a number of ways, including as a polygon boundary, the interior of which is the area to be mowed. The polygons may include other polygons within their boundaries (holes) that are areas that are not be mowed and may correspond to obstacles, untraversable areas, or keep-out zones. The polygons may be further annotated, such as when they represent mowing areas within rows of a solar field (between rows of solar panels), to provide additional guidance on the creation of mowing paths within the rows that result in efficient and consistent patterns.

The primary features of solar sites are the numerous rows of solar panels, and setting up a solar site requires defining mowing areas within all of the rows of panels. Even relatively small sites can have several hundred rows, and mapping each of the rows directly can be impractical, even for an unmanned and autonomous robot. Instead, the regularity, and precise geometric layout of the panels on these sites can be used to identify the location and size of all the rows without measuring all of them directly. For example, by measuring the location of three points in a section of solar panel rows, such as three extreme corners of the section (where each corner might be defined as the point of intersection between the centerline of the panels at the end edge of a row of panels), as well as the row pitch (the distance between neighboring rows), a mow area defined for a single row can be replicated across an entire section. A section could consist of as few as two panels, or have a hundred or more. A similar process can be used to generate transit paths throughout the section as well.

The three-point survey could be performed in an augmented fashion, for example, by placing a high accuracy GPS antenna over each corner location of a solar panel section and recording the corresponding measured location. The same measurements can be obtained from an autonomous vehicle using lidar or another sensing modality where each corner point is detected and its location is estimated based on the combined position of the vehicle and the range and bearing of the measurement from the vehicle. To minimize error in the measured location of these survey points, multiple detections and measurements of the same locations can be acquired as the vehicle moves around the site, and those measurements can be combined (e.g. via averaging) to improve the accuracy of the location estimate).

Alternatively, the site setup task need not be performed completely autonomously. In many cases, simple guidance may be provided by a user/operator or other automated source to facilitate quicker and more accurate setup of the site. For example, a user may create an initial route network for a site by drawing paths on images taken from overhead, by outlining panel sections on such overhead imagery, or by defining rough open area polygon mow regions. While these routes and regions will generally not be accurate enough for direct use by the vehicle for normal mowing operations, particularly within the solar panel rows, this initial rough route development is useful for creating paths for the vehicle to travel in order to collect the measurements necessary, such as the three-point surveys, to fully generate and refine the site map. Such guidance also helps to avoid the pitfalls of trying to identify all of the mow areas by blindly exploring the site.

The resulting site map may consist of multiple different features including a route network, rows, and polygons as well as the connectivity between these features. Polygons and rows generally may be areas designated for mowing. Rows existing in and amongst solar panels may imply that the mowing will take place in close proximity to physical infrastructure including solar panels and their supports. Polygons may represent open areas with no permanent obstacles. The route network may be a set of points and connections between the points that can be used for routing/navigation around a side.

Polygon regions may be established where large scale obstacles like fences, buildings and solar panel rows are used to identify the natural boundaries of the site and create polygons to fit those boundaries. Some of these auto site setup tasks/measurements may also be performed by other robotic or autonomous devices such as UAVs/drones.

Disclosed herein are various implementations directed to solutions for enabling an autonomous vehicle to perform initial operating site setup to include obstacle detection, navigational reference point identification, and two-part "travel-and-task" path development. Several such implementations are also directed to autonomous vehicles that can perform the solutions presented herein in whole or in part. Also disclosed are solutions for an autonomous vehicle to perform an initial navigational setup at an operating site by: receiving initial location and orientation data pertaining to the autonomous vehicle; iteratively sensing a plurality of recognizable objects and determining a plurality of fixed reference locations corresponding to each of the plurality of recognizable objects relative to the initial location and orientation data; and developing an operational path plan for the autonomous vehicle to traverse the operating site based on the plurality of fixed reference locations. For select implementations, the autonomous vehicle may be an autonomous mower, the dynamic object may be a solar panel and/or solar panel post, and the sensing may be performed using light detection and ranging (lidar).

Exemplary Configurations

An autonomous mower is one example of an autonomous vehicle and which may comprise a mowing deck and a tractor. The tractor may also include a main body that houses various electrical components and electronics such as batteries, drive motors, a battery- or power-management system, component controllers, sensors (e.g., lidar, radar, IMU, inertial navigation systems, temperature sensors, humidity sensors, noise sensors, accelerometers, pressure sensors, GPS, ultrasonic sensors, cameras or other sensors), network interface devices, a computer system to provide overall control of the mower, and/or other components.

A mowing deck (or "mowing platform") may include one or more blades disposed below the mowing deck. The mowing deck may supported by a number of wheels. For certain implementations, the mowing deck may be cantilevered from tractor without supporting wheels. Power may be provided through electrical connections to motors on mowing deck to drive the mower blades.

A mowing deck may be adapted to provide for low-profile mowing that can pass under solar panels, even when the solar panels are positioned close to the ground and the tractor cannot drive under them. For example, a mowing deck may be disposed forward of tractor and outside of the wheels of a tractor, and thus the tractor can drive the mowing deck into spaces which the tractor cannot go such as under panels that are lower to the ground than the top of the tractor. The form factor of the mowing deck may be selected to achieve a desired cutting width and low profile. A mowing deck may also be otherwise configured to have a larger or smaller width, to work in different clearances, and to have different mowing heights. For several implementations, a mowing deck may be raised and lowered and, in addition or in the alternative, a mowing deck may be tilted up and down.

Figure 7A:
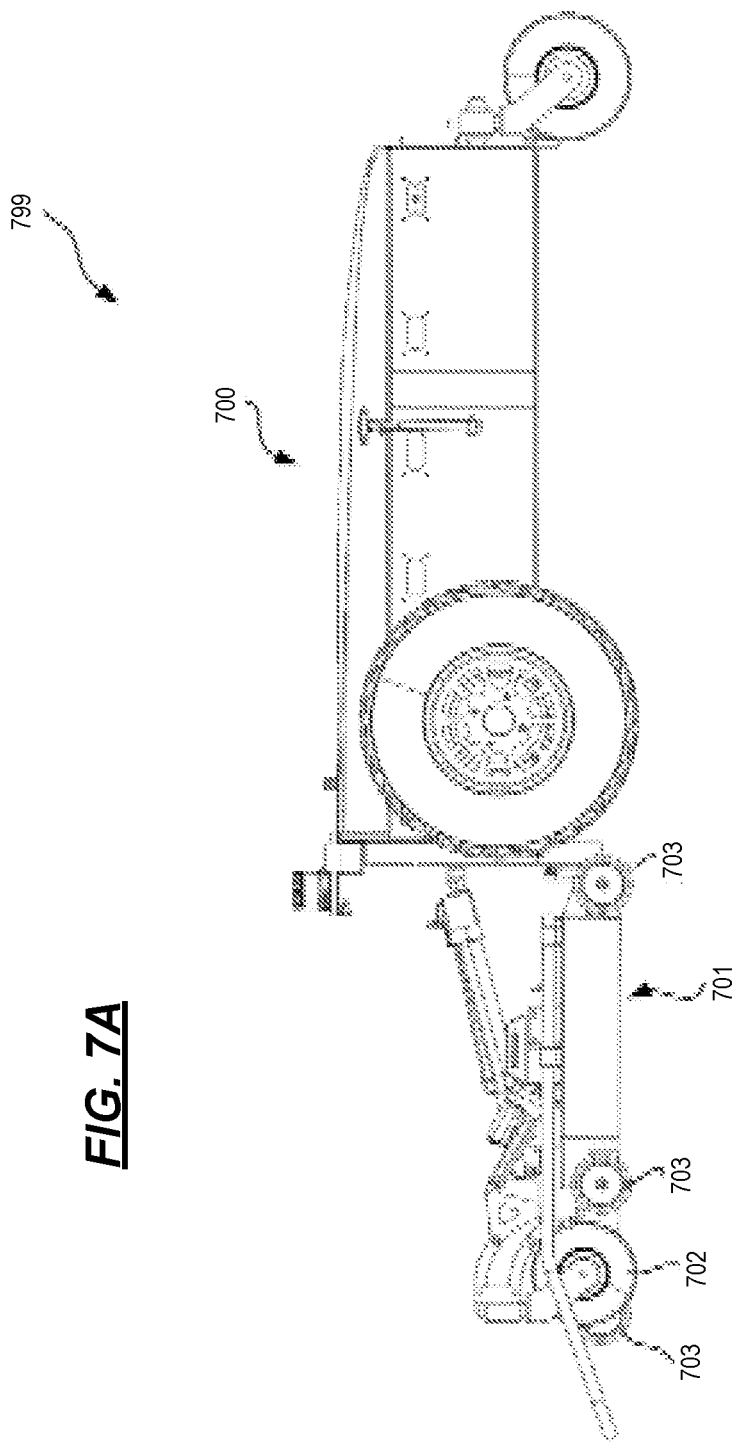
FIG. 7A is a first diagrammatic illustration of an autonomous mower—specifically, a side view of autonomous mower 799 that comprises tractor 700 and a mowing deck 701—as an exemplary implementation of an autonomous vehicle representative of the various implementations disclosed herein.

FIG. 7A is a first diagrammatic illustration of an autonomous mower—specifically, a side of view of a autonomous mower 799 that comprises a tractor 700 and a mowing deck 701—as an exemplary implementation of an autonomous vehicle representative of the various implementations disclosed herein.

Figure 7B:
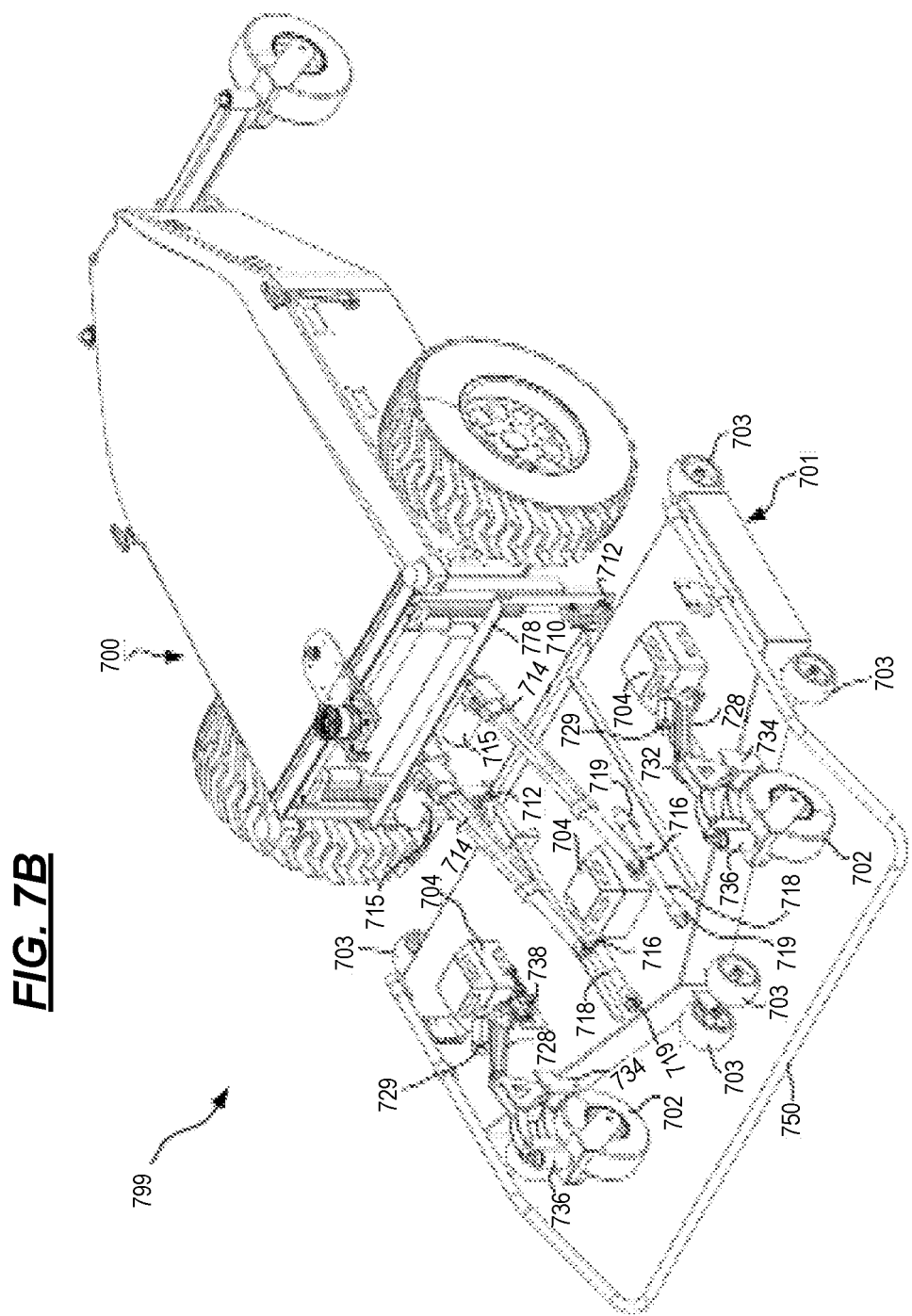
FIG. 7B is a second diagrammatic illustration of the autonomous mower of FIG. 7A—specifically, an oblique front view of autonomous mower 799 that comprises tractor 700 and a mowing deck 701—as an exemplary implementation of an autonomous vehicle representative of the various implementations disclosed herein.

FIG. 7B is a second diagrammatic illustration of the autonomous mower of FIG. 7A—specifically, an oblique front view of a autonomous mower 799 that comprises tractor 700 and a mowing deck 701—as an exemplary implementation of an autonomous vehicle representative of the various implementations disclosed herein.

Figure 7C:
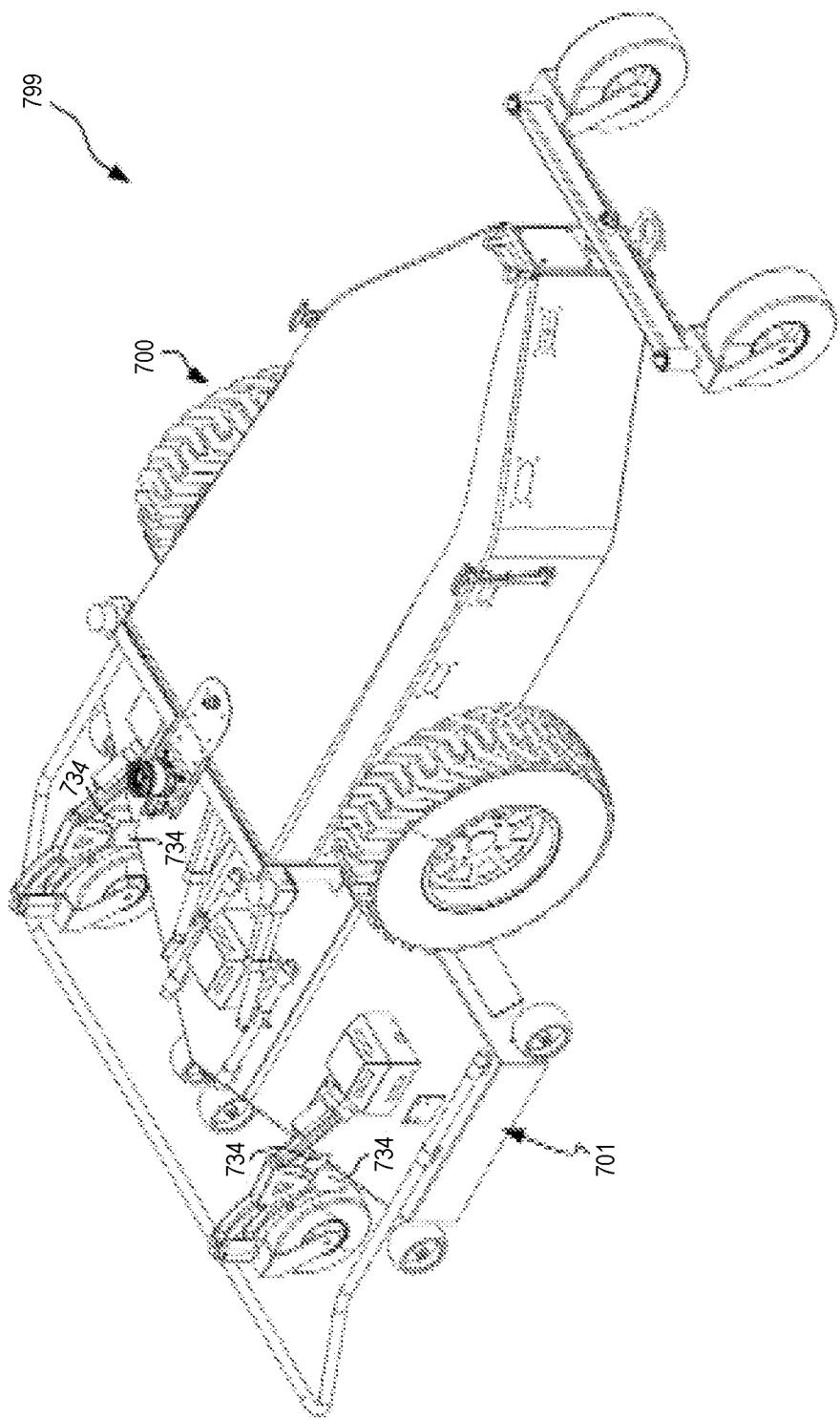
FIG. 7C is a third diagrammatic illustration of the autonomous mower of FIGS. 7A and 7B—specifically, an oblique rear view of autonomous mower 799 that comprises tractor 700 and a mowing deck 701—as an exemplary implementation of an autonomous vehicle representative of the various implementations disclosed herein.

FIG. 7C is a third diagrammatic illustration of an autonomous mower of FIGS. 7A and 7B—specifically, an oblique rear view of a autonomous mower 799 that comprises tractor 700 and a mowing deck 701—as an exemplary implementation of an autonomous vehicle representative of the various implementations disclosed herein.

In FIGS. 7A, 7B, and 7C—which may be referred to collectively hereinafter as "FIG. 7" for convenience—autonomous mower 799 may include one or more blades disposed below a mowing deck 701. The mowing deck may be supported by a number of wheels including contact wheels 702 which can be moved to maintain contact with the ground and other wheels 703. Power may be provided through electrical connections to motors 704 on mowing deck 701 to drive the mower blades.

Mowing deck 701 may be adapted to provide for low-profile mowing that can pass under solar panels, even when the solar panels are positioned close to the ground and the tractor cannot drive under them. Mowing deck 701 may be disposed forward of tractor 700 and outside of the wheels of tractor 700, and thus tractor 700 might drive the mowing deck 701 into spaces which tractor 700 itself cannot go, such as under panels that are lower to the ground than the top of tractor 700. The form factor of the mowing deck may be selected to achieve a desired cutting width and low profile. Mowing deck 701 may be otherwise configured to have a larger or smaller width, to work in different clearances and to have different mowing heights.

The rear of mowing deck 701 may be mounted to tool mounting bracket 770 using a hinged connection such that the front of mowing deck 701 can be tilted up. For example, mowing deck 701 may include rearwardly extending hinge members 710. Hinge pins 712 may extend laterally from hinge members 710 to pass through the respective hinge pin openings 783. Hinge pins 712 may comprise bolts that pass-through hinge members 710 and side plates 782. The hinge pins 712 may define an axis of rotation for tilting mowing deck 701 relative to tractor 700.

Additionally, mowing deck 701 may be coupled to tool mounting bracket 770 by tilt actuators 714, which are linear actuators driven by electric motors 715. A first end of each tilt actuator 714 may be rotatably coupled to tool mounting bracket 770 at attachment points 779. The second end of each tilt actuator 714 (e.g., the end of the drive tube) may be connected to the top of mowing deck 701 by a slidable connection or other connection that allows translation. More particularly, guiderails 718 may be attached to and spaced from the top surface of mowing deck 701 (e.g., by standoffs 719) and the second end of each tilt actuator may be coupled, at a rotatable connection, to a sleeve 716 that is translatable along the respective guiderail 718. Biasing members, such as springs disposed about the guiderails 718, may be provided to bias the sleeves 716 forward or rearward.

Autonomous mower 799 thus may include a lift and tilt mowing deck 701. Retracting and extending lift actuators 784 may lift and lower tool mounting bracket 770 and hence mowing deck 701. Retracting tilt actuators 714 may tilt the front end of mowing deck 701 up and extending tilt actuators 714 may lower the front end of mowing deck 701. As discussed above, the capability to lift/tilt the mowing surface may provide a mobile automated maintenance system the enhanced capability to adapt to different contours of the ground and thereby may provide the advantage of level cutting of vegetation by the mowing system. Moreover, the capability to tilt the mowing deck 701 may increase the ease of maintenance and may provide an operator easy access to replace or maintain the mowing blades.

Mowing deck 701 may also include contact wheels 702 that may be operationally coupled to contact wheel actuators 728 (e.g., by linkages 732). Contact wheel actuators 728, which may be linear actuators driven by electric motors 729, may be actuated to maintain contact between contact wheels 702 and the ground and in some cases to maintain a desired amount of deck front pressure (e.g. pressure between wheels 702 and the ground). Moving wheels to maintain a desired amount of contact may allow mowing deck 701 to better follow the contour of the ground or to allow wheels 702 to continue to provide support at the front portion of mowing deck 701 when mowing deck 701 is lifted by lift actuators 784. Moreover, maintaining pressure on contact wheels 702 may be used to help regulate the traction of drive wheels 756 and, as discussed earlier herein, to sense anomalies in the ground that could be obstacles to navigation representative of various implementations herein disclosed.

In addition, a first end of each contact wheel actuator 728 may be rotatably coupled to the top of mowing deck 701.

The second end of each contact wheel actuator 728 (e.g., the end of the drive tube, in the illustrated embodiment) may be rotatably coupled to a respective linkage 732. A first end of each linkage may be rotatably coupled to the front of mowing deck 701. The end of each linkage 732 may then capture a pin or other member disposed between a respective pair of forwardly extending plates 734. The distal end of each linkage 732 may include a collar 736 with an internal bushing to receive the shank of a respective contact wheel caster. Extending contact wheel actuators 728 may cause the respective linkages 732 to rotate, pushing the respective contact wheels 702 down. Retracting contact wheel actuators 728 may cause the respective linkages 732 to rotate and pull the respective contact wheels 702 up relative to mowing deck 701.

Mowing deck 701 may include a variety of sensors, such as sensors 738 to measure the frontside pressure at contact wheels 702 (one sensor 738 is visible in FIG. 7B, but a similar sensor can be provided for the other contact wheel). Rotary sensors may be used to output an indication of an amount of contact, and other sensors may also be used. The output of sensors 738 may be used for active control of mowing deck and provide information about the terrain usable in future control decisions.

Mowing deck 701 may include a bump bar 750 which may incorporate a sensor to indicate that autonomous mower 799 has run into an obstacle. Bump bar 750 may also incorporate a kill switch such that autonomous mower 799 will stop the blades, stop moving, shut down, or take other action in response to bump bar 750 bumping into an obstacle with a threshold amount of force. The various motors and sensors associated with mowing deck 701 may be electrically connected to controllers in main body 752.

Notably the mowing deck may be cantilevered (or substantially cantilevered) instead of or in addition to being minimally supported by contact wheels 702 or other deck wheels 703, in which case the contact wheels 702 might be utilized primarily for sensing holes, edges, and other obstacles in accordance with the various implementations disclosed herein.

For certain implementations, mowing deck 702 can connect to tractor 701 using a tool mounting bracket such as tool mounting bracket 770 that may be slidably coupled to the tractor 701. Mowing system 700 may also include lift actuators 784 to lift the mowing deck 702 and tilt actuators 714 to tilt the mowing deck 702. It can be noted then the lift and tilt actuators can be independently controlled to provide increased control over the pitch (rotation about a lateral (side-to-side) axis) and roll (rotation about a longitudinal (front-to-rear) axis) of the mowing deck and the robot can be controlled to control the yaw (rotation about the vertical axis) of the mowing deck. It can be further noted that in some embodiments, all the motors, actuators in a robot or automated maintenance system may be electrical thus eliminating the possibility of hydraulic oil leaks that is present if hydraulic actuators are used.

Figure 8:
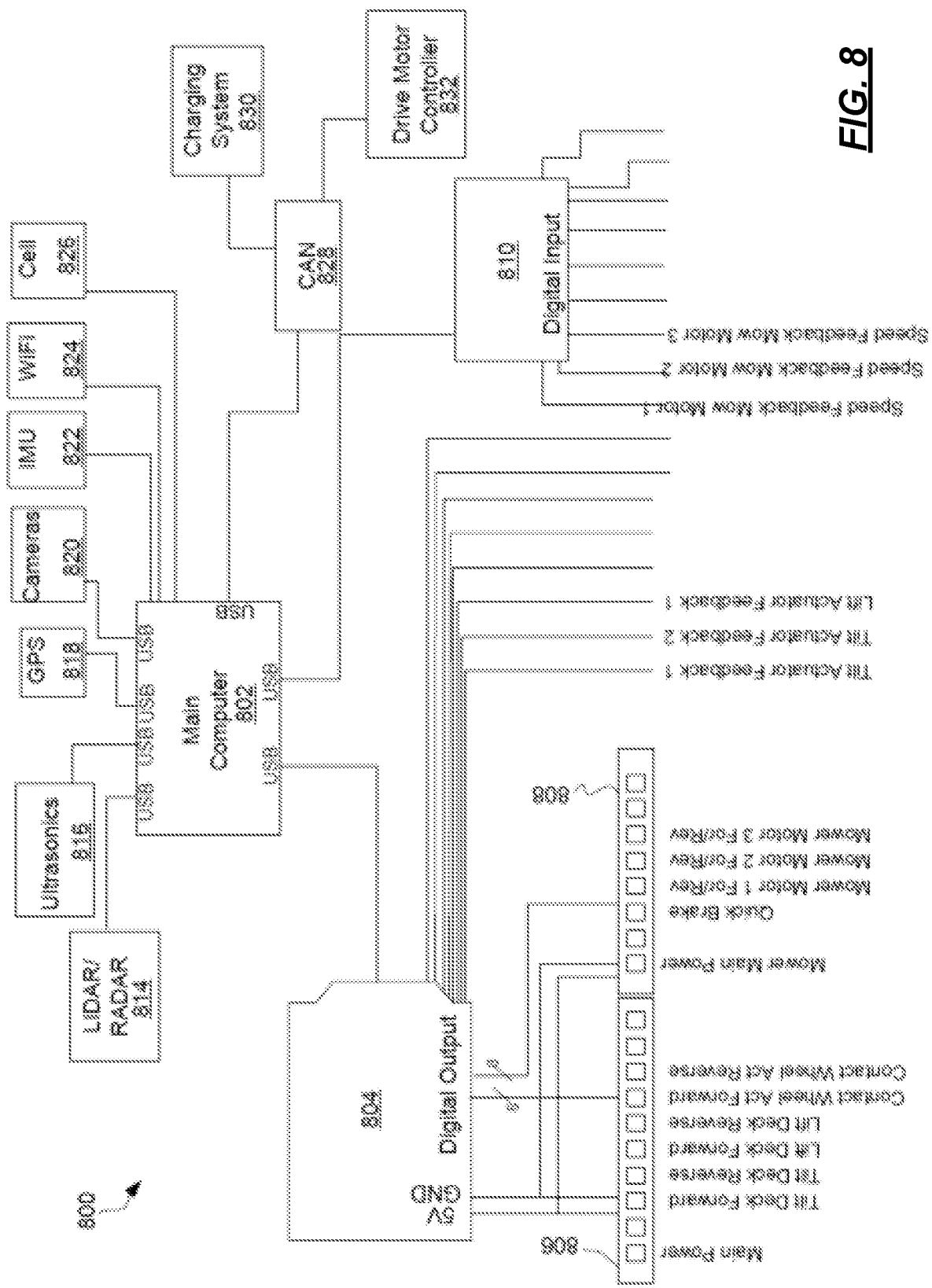
FIG. 8 is a diagrammatic illustration of an exemplary control system for an autonomous vehicle such as, for example, the autonomous mower illustrated in FIGS. 7A, 7B, and 7C and representative of the various implementations disclosed herein.

FIG. 8 is a diagrammatic illustration of an explanatory control system for an autonomous vehicle such as, for example, the autonomous mower illustrated in FIG. 7 and representative of the various implementations disclosed herein. More specifically, FIG. 8 is a diagrammatic representation of certain implementations of a control system for an autonomous mower such as autonomous mower 310. Components of FIG. 8 may be housed in an autonomous, unmanned vehicle, such as a tractor. Control system 800 may include a main computer 802 to provide overall control of the tractor or other autonomous vehicle. For select implementations, main computer 802 may be a computer system adapted for expected operating conditions of the autonomous vehicle. By way of example but not limitation, main computer 802 may be a fan-less embedded system suited for industrial applications, and/or main computer 802 may include software and hardware to implement a state machine comprising, for example, autonomy, halt-and-wait capabilities, and remote-control states, as well as control autonomous navigation, maintenance operation functionality, and other functionality described, disclosed, or otherwise suggested herein.

In the specific implementation illustrated in FIG. 8, main computer 802 may be connected to various controllers that control the distribution of power to and receive feedback from various components. Main computer 802 may also be connected to a first controller 804 by a bus, such as a USB or other bus architecture. First controller 804 may control the distribution of power to various components as needed, for example, first controller 804 may control logic relays 806 to provision main power for drive motor controller 832, control power to drive motor controller 832, and forward or reverse power to tilt actuator motors, lift actuator motors, and wheel actuator motors. Via relays 808, first controller 804 may control distribution of power to the motor controllers of the mower motors that turn the mower's blades. In this example, each mower motor controller may have a main power input, an enable control signal input (e.g., high level/stop low level/run), a quick brake input (e.g., high level/stop, low/level run), a forward/reverse (F/R) input, and/or other inputs. First controller 804 may also control the signals to these inputs to start/stop and otherwise control power to the mower motors as needed.

First controller 804 may also receive feedback from various components. For example, lift actuators, tilt actuators, and wheel actuators may incorporate Hall Effect sensors or other sensors to provide feedback indicative of position, movement, or other related information. Moreover, first controller 804 can receive feedback from wheel pressure sensors. First controller 804 can provide data based on the feedback to main computer 802 indicative of, for example, speed, position or other condition of the actuators or contact wheels.

Main computer 802 may be further connected to second controller 810 via a communications bus such as a USB bus. Second controller 810 may receive feedback from various components of the attached tool. In this example, second controller 810 may connect to speed feedback outputs and alarm outputs of the mower motor controllers. For some implementations, second controller 810 may also provide hardware monitoring of various components of the attached tool and main computer 802 can provide software monitoring. Main computer 802 may be connected to various other components of the autonomous vehicle.

Additionally, one or more sensor components may be connected to main computer 802 over a communications bus. For example, main computer 802 may be connected to a lidar and/or radar unit 814, ultrasonic sensors 816, GPS 818, cameras 820 and an IMU 822. Main computer 802 may also be connected to (or include) various network interfaces. For example, main computer 802 may be connected to a Wi-Fi adapter 824 and a cellular network adapter 826. In the specific implementation illustrated in FIG. 8, the communications bus is a USB bus, although any suitable communications bus may be used. Furthermore, as illustrated in FIG. 8, main computer 802 may be connected to one or more components of a charging system 830 and a drive motor controller 832 by a controller area network (CAN) 828 or other connection. Main computer 802 can, for example, communicate with drive motor control to control drive motors to turn the drive wheels and battery management system to receive data regarding battery status and control charging and discharging of batteries.

Control system 800 is provided by way of example and not intended to limit the disclosures and implementations described herein in any way. For some implementations, the control system 800 of an autonomous vehicle, such as a tractor 710 or other mobile automated or autonomous system, can be reconfigured for a particular type of tool. For example, for a cantilever mowing deck there would not be a connection for (or the connection would not be used) for the deck wheel actuators, nor would connections for deck wheel actuator feedback be used. For certain implementations, control system 800 could be reconfigured as needed to provide appropriate controllers and/or software configuration of main computer 802.

Figure 9:
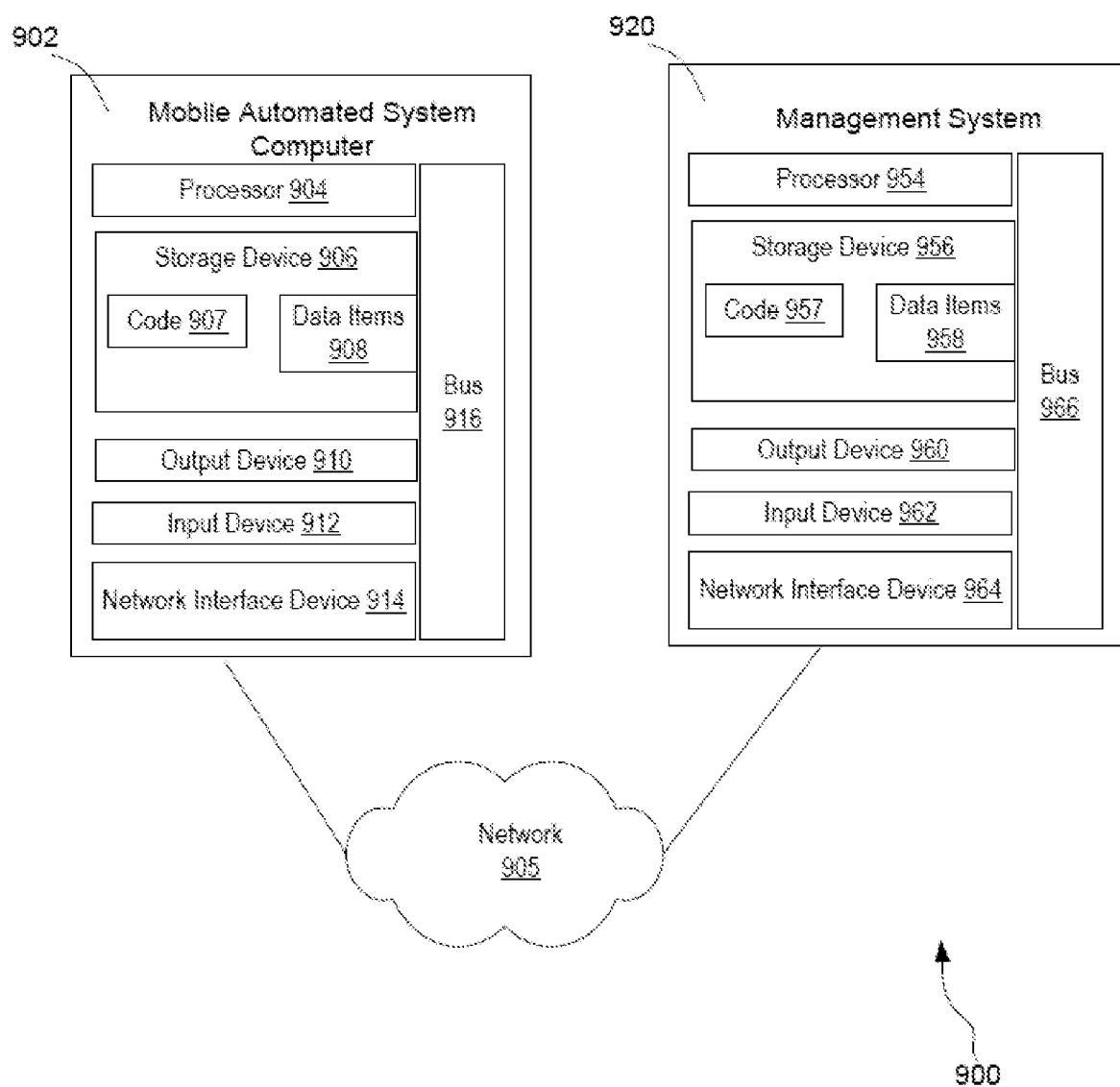
FIG. 9 is a block diagram illustrating an exemplary network system representative of the various implementations disclosed herein.

FIG. 9 is a block diagram illustrating an exemplary network system representative of the various implementations disclosed herein. More specifically, FIG. 9 is a diagrammatic representation of various implementations of a maintenance network system 900 comprising a computer 902 communicatively coupled to a central management system 920 via a network 905. Computer 902 may be one example of a computer for controlling a robot including a robot that provides a mobile automated maintenance system. Computer 902 may be one instance of a main computer 802 of an autonomous mower. Central management system 920 also may be one instance of management system 106.

Computer 902 may include a processor 904, a storage device 906, an output device 910, an input device 912, and a network interface device 914 connected via a bus 916. Processor 904 may represent a central processing unit of any type of processing architecture, such as CISC (Complex Instruction Set Computing), RISC (Reduced Instruction Set Computer), VLIW (Very Long Instruction Word), a hybrid architecture, or a parallel architecture in which any appropriate processor may be used. Processor 904 executes instructions and may include that portion of the computer that controls the operation of the entire computer. Processor 904 may also include a control unit that organizes data and program storage in memory and transfers data and other information between the various parts of the computer. The processor receives input data from the input device 912 and the network, reads and stores code and data in the storage device 906 and outputs data to the output devices 910.

Although a single processor, input device, storage device output device, and single bus are illustrated in FIG. 9, computer 902 may have multiple processors, input devices, storage devices, output devices and busses with some or all performing different functions in different ways. Furthermore, storage device 906 may represent one or more mechanisms for storing data. For example, storage device 906 may include read-only memory (ROM), random access memory (RAM), magnetic disk storage media, optical storage media, flash memory devices, solid state device storage media, and/or other machine-readable media, both non-transitory and transitory in nature. In other implementations, any appropriate type of storage device may be used, and/or multiple types of storage devices may be present. Additionally, multiple and different storage devices and types may be used in conjunction with each other to perform data storage functions for the computer. Furthermore, although the computer is illustrated in FIG. 9 as containing the storage device, the storage device may be distributed across other computers communicatively coupled over a suitable network such as, for example, on a remote server.

Storage device stores code 907 and data items 908 therein. Code 907 may be capable of storing instructions executable by processor 904 to carry out various functions described herein including but not limited to autonomous navigation and other functions. In some implementations, code 907 may be executable to implement a command center application. In other implementations, code 907 may be executable to implement a mow pattern planner. In some implementations, code 957 may be executable to implement a path generator. In some implementations, code 957 may be executable to implement a route generator. In some implementations, code 907 may be executable to implement a state machine having, for example, an autonomy state, a hold-and-wait state, and a remote-control state. In other implementations, some or all of the functions may be carried out via hardware in lieu of a processor-based system.

As will be understood by those of ordinary skill in the art, the storage device may also contain additional software and data (not shown). Indeed, data items 908 may include a wide variety of data including but not limited to configuration data, data collected by the autonomous vehicle during use, data provided to the autonomous vehicle by the central management system 920 or other system, maintenance plans, path information, and other data. Although the code 907 and the data items 908 as shown to be within the storage device 906 in the computer 902, some or all of them may be distributed across other systems communicatively coupled over the network, for example on a server.

Output device 910 represents devices that may output data to a user or direct data to be sent to other systems connected through the network. The output may be a liquid crystal display (LCD), in one example, though any suitable display device may be used. For certain implementations, an output device displays a user interface. Any number of output devices can be included, including output devices intended to cause data to be sent to other systems connected through network 905. Input device 912 may represent one or more devices that provide data to processor 904, and input device 912 may represent user input devices (e.g., keyboards, trackballs, keypads and the like), sensors, or other input devices.

The network interface device 914 may provide connection between the computer 902 and network 905 through any suitable communications protocol. The network interface device 914 sends and receives data items from the network. Bus 916 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Channel Architecture), IEEE 994, or any other appropriate bus and/or bridge.

Computer 902 may be implemented using any suitable hardware and/or software. Peripheral devices such as auto adapters or chip programming devices, such as EPROM (Erasable Programmable Read-Only Memory) programming devices may be used in addition to, or in place of, the hardware already depicted. Computer 902 may be connected to any number of sensors or other components via a bus, network or other communications link.

Network 905 may be any suitable network and may support any appropriate protocol suitable for communication to the computer. Network 905 can include a combination of wired and wireless networks that the network computing environment of FIG. 9 may utilize for various types of network communications. For example, network 905 can include a local area network (LAN), a hotspot service provider network, a wide area network (WAN), the Internet, GPRS network or other cellular data network or cell-based radio network technology mobile network, an IEEE 802.llx wireless network or other type of network or combination thereof. For some implementations, network 905 may support the Ethernet IEEE 802.3x specification. For some implementations, network 905 may support IP (Internet Protocol) over either or UDP (User Datagram Protocol).

For some implementations, a mobile automated system can communicate with a central management system 920 via network 905 to communicate data to and receive data and commands. For example, computer 902 may send status information, alerts, collected data and other information to central management system 920. Similarly, computer 902 can receive updated routing information, maintenance plans, decision algorithms or other information from central management system 920. For some implementations, code 907 implements watchers to watch for various commands from central management system 920.

For some implementations, a mobile automated system may operate in various states including, but not limited to an autonomy state and a remote-control state. In an autonomous state, the mobile automated system (e.g., under the control of computer 902) performs autonomous navigation to generate paths, generate routes, follow routes, implement maintenance plans or take other actions without human intervention. Autonomous navigation can include route following, collision avoidance and other aspects of autonomous navigation. In some cases, the mobile automated system may encounter a situation that requires intervention, such as becoming stuck or encountering an obstacle that the mobile automated system cannot navigate around. The mobile automated system can send alerts to central management system 920 and, in some cases, await further instructions before moving again.

Central management system 920 may communicate with computer 902 to update the mobile automated system, put the mobile automated system in a manual state or carry out other actions. Central management system 920 can provide an interface, such as a web page or mobile application page, through which an operator can control the mobile automated system in the manual state. Commands entered by the operator (e.g., movement commands or other commands) are routed to computer 902 over network 905 and computer 902 controls the mobile automated system to implement the commands. Central management system 920 can further return the mobile automated system to an autonomous state. Central management system 920 may provide a centralized management for a large number of geographically dispersed mobile automated systems.

Central management system 920 may be one instance of management system 106. Central management system 920 includes a processor 954, a storage device 956, an output device 960, an input device 962, and a network interface device 964 connected via a bus 966. Processor 954 represents a central processing unit of any type of processing architecture, such as CISC (Complex Instruction Set Computing), RISC (Reduced Instruction Set Computer), VLIW (Very Long Instruction Word), a hybrid architecture, or a parallel architecture. Any appropriate processor may be used. Processor 954 executes instructions and may include that portion of the computer that controls the operation of the entire computer. Processor 954 may include a control unit that organizes data and program storage in memory and transfers data and other information between the various parts of the computer. The processor receives input data from the input device 962 and the network, reads and stores code and data in the storage device 906 and outputs data to the output devices 960. While a single processor, input device, storage device output device and single bus are illustrated, Central management system 920 may have multiple processors, input devices, storage devices, output devices and busses with some or all performing different functions in different ways. Moreover, various secure communications approaches may be utilized, as well as other security measures known and appreciated by skilled artisans.

Storage device 956 represents one or more mechanisms for storing data. For example, storage device 956 may include read-only memory (ROM), random access memory (RAM), magnetic disk storage media, optical storage media, flash memory devices, solid state device storage media, and/or other machine-readable media. For some implementations, any appropriate type of storage device may be used. Multiple types of storage devices may be present. Additionally, multiple and different storage devices and types may be used in conjunction with each other to perform data storage functions for the computer. Further, although the computer is drawn to contain the storage device, it may be distributed across other computers communicatively coupled over a suitable network, for example on a remote server.

Storage device stores code 957 and data items 958 therein. Code 957 can include instructions executable by processor 954 to carry out various functionality described herein. For some implementations, code 957 is executable to implement a command center application. For some implementations, code 957 is executable to implement a mow pattern planner. For some implementations, code 957 is executable to implement a path generator. For some implementations, code 957 is executable to implement a route generator. For some implementations, some or all of the functions are carried out via hardware in lieu of a processor-based system. As will be understood by those of ordinary skill in the art, the storage device may also contain additional software and data (not shown). Data items 958 can include a wide variety of data including, but not limited to, configuration data, data collected from the autonomous mower, data provided to central management system 920 by other systems, maintenance plans, path information, and other data. Although the code 957 and the data items 958 as shown to be within the storage device 956, some or all of them may be distributed across other systems communicatively coupled over the network.

Output device 960 represents devices that output data to a user or direct data to be sent to other systems connected through the network. The output may be a liquid crystal display (LCD), in one example, though any suitable display device may be used. For some implementations, an output device displays a user interface. Any number of output devices can be included, including output devices intended to cause data to be sent to other systems connected through network 905. Input device 962 represents one or more devices that provide data to processor 954. Input device 962 can represent user input devices (e.g., keyboards, trackballs, keypads and the like), sensors or other input devices.

The network interface device 964 connects between central management system 920 and network 905 through any suitable communications protocol. The network interface device 964 sends and receives data items from the network. Bus 966 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Charmel Architecture), IEEE 994, or any other appropriate bus and/or bridge.

Central management system 920 may be implemented using any suitable hardware and/or software. For some implementations, central management system 920 may be implemented according to a cloud-based architecture. Peripheral devices such as auto adapters or chip programming devices, such as EPROM (Erasable Programmable Read-Only Memory) programming devices may be used in addition to, or in place of the hardware already depicted. Central management system 920 may be connected to any number of sensors or other components via a bus, network or other communications link.

Figure 10:
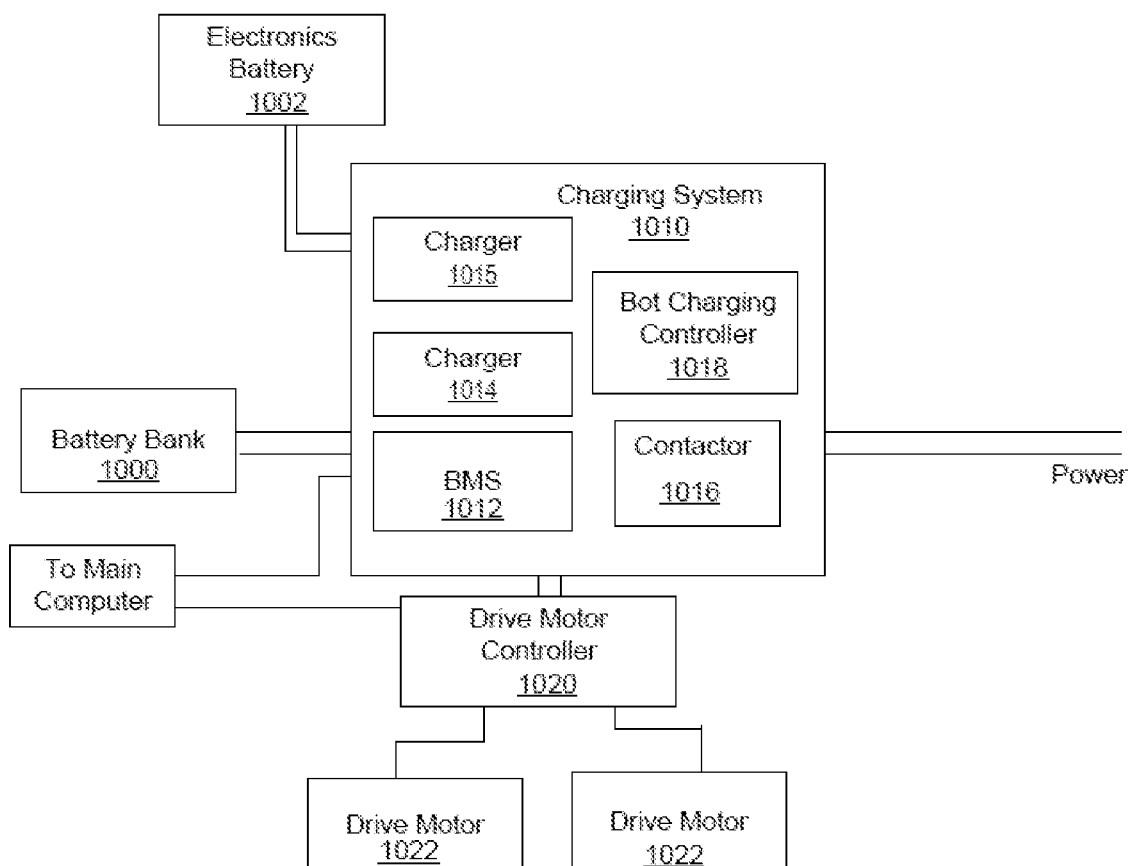
FIG. 10 is a block diagram illustrating exemplary power and drive components for an autonomous vehicle, an autonomous robot, an autonomous mower, or other autonomous system representative of the various implementations disclosed herein.

FIG. 10 is a block diagram illustrating exemplary power and drive components for an autonomous vehicle, an autonomous robot, an autonomous mower, or other autonomous system representative of the various implementations disclosed herein. More specifically, FIG. 10 is a block diagram illustrating exemplary power and drive components for an autonomous vehicle, an autonomous robot, an autonomous mower, or other autonomous system representative of the various implementations disclosed herein. More specifically, FIG. 10 is a block diagram illustrating select implementations of power and drive components of a robot, such as autonomous mower 310 or autonomous mower 700 or other mobile automated system. With regard to FIG. 10, the robot includes a main battery bank 1000 having one or more battery modules (for example one or more lithium ion or other rechargeable battery modules). The number of modules needed may be increased or decreased for a variety of reasons, including, but not limited to, altering the amount of power for the maintenance system based on the location of the maintenance system, and run time needed for the maintenance system and any attached devices. For some implementations, the robot contains 8 48V battery modules, with each having approximately 2850 kWh of power. As will be well understood by one of ordinary skill in the art, the efficiency of battery systems may increase over time, and any number of battery modules may be used.

The battery modules of main battery bank 1000 may be a higher voltage than supported by computers (e.g., main computer 802), actuators, various electronics or other components of the mobile automated system. For some implementations, the robot can include one or more secondary batteries 1002 to power the main computer 802, various sensors, electronics, logic relays and other components. For example, or some implementations a robot may include a common car, motorcycle, Gel cell battery or the like.

As illustrated in FIG. 10, the robot can include a charging system 1010 that includes various components involved in charging the batteries. The charging can be an example of charging system 830. As illustrated, the charging system includes battery management system (BMS) 1012, charger 1014, contactor 1016 and bot charging controller 1018. Various components of the charging system can be connected to a bot computer (e.g., main computer 802) by a network or other communications link.

For some implementations, BMS 1012 is directly connected to battery bank 1000 and is adapted to manage and maintain batteries in battery bank 1000. As will be appreciated, BMS 1012 can provide various functions with respect to the rechargeable batteries of main battery bank 1000. By way of example, BMS 1012 can provide constant monitoring of charge balance, generate alerts, and implement preventive action to ensure proper charging. For some implementations, BMS 1012 assesses battery profiles for the battery modules of battery bank 1000 and the temperature of the battery modules, oversees balancing, performs monitoring of battery health and ensure battery bank 1000 is being charged in a safe manner (e.g., not being overcharged, not exceeding temperature limits, etc.). For some implementations, a bot computer (e.g., main computer 802) is connected to BMS 1012 (e.g., by a CAN or other communication link) and monitors/controls whether BMS 1012 allows charging.

The charging system further includes a charger 1014 to charge the batteries in battery bank 1000. Charger 1014 includes one or more chargers that have programmed profiles for the battery modules of battery bank 1000. Charger 1014 monitors the voltage of the battery bank 1000 and, if a charging voltage is out of range, stops charging. The charging system also includes a charger 1015 to charge secondary battery 1002 from main battery bank 1000. For some implementations, the charging system includes or is connected to a contactor 1016 that is electrically coupled to the charging contacts of the robot. Contactor 1016 can be selectively engaged and disengaged to allow charging when the bot is docked at a charging station.

The charging system includes a bot charging controller 1018 electrically coupled to the charging contacts. Bot charging controller 1018, for some implementations, is configured to determine when the robot has docked with a charging dock and engage/disengage contactor 1016 as needed to connect the charge power lines to charger 1014 and/or BMS 1012 to charge batteries in main battery bank 1000. For some implementations, the determination that the robot has docked successfully may be based, in part on a data communication between bot charging controller 1018 and a charging station controller. Such communication may be implemented according to any suitable protocol including power-line protocols or other protocols. To this end, bot charging controller 1018 may include a power-line communication or other adapter for communicating with the charging station.

The robot includes a drive motor controller 1020, which may be one example of drive motor controller 832. Drive motor controller 1020 is electrically connected to the drive motors 1022 that turn the drive wheels of the robot. For some implementations, drive motor controller 1020 distributes power from battery bank 1000 to drive motors 1022 based on commands from the main computer. For some implementations, drive motor controller 1020 is connected to the main battery bank 1000 through the charging system, for example, through BMS 1012 or other components.

Figure 11:
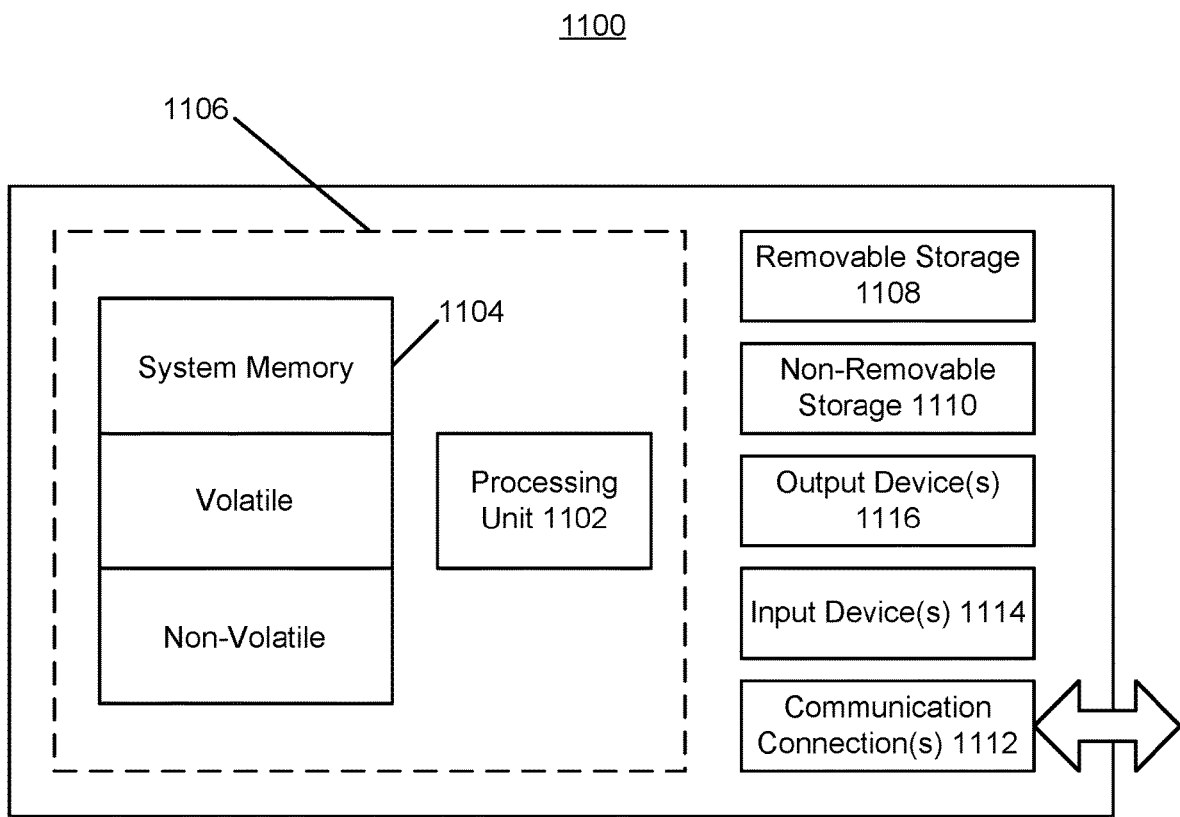
FIG. 11 is a block diagram of an example computing environment that may be used in conjunction with any of the various implementations and aspects herein disclosed.

FIG. 11 is a block diagram of an example computing environment that may be used in conjunction with example implementations and aspects such as those disclosed and described with regard to FIGS. 1-10. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), an analog-to-digital converter (ADC), or other programmable logic device, discrete gate or transistor logic, discrete hardware components, discrete data acquisition components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

With reference to FIG. 11, an exemplary system for implementing aspects described herein includes a computing device, such as computing device 1100. In a basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This basic configuration is illustrated in FIG. 11 by dashed line 1106 as may be referred to collectively as the "compute" component.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110. Computing device 1100 typically includes a variety of computer readable media. Computer readable media can be any available media that can be accessed by device 1100 and may include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store the information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, and so forth. Output device(s) 1116 such as a display, speakers, printer, and so forth may also be included. All these devices are well-known in the art and need not be discussed at length herein. Computing device 1100 may be one of a plurality of computing devices 1100 inter-connected by a network. As may be appreciated, the network may be any appropriate network, each computing device 1100 may be connected thereto by way of communication connection(s) 1112 in any appropriate manner, and each computing device 1100 may communicate with one or more of the other computing devices 1100 in the network in any appropriate manner. For example, the network may be a wired or wireless network within an organization or home or the like, and may include a direct or indirect coupling to an external network such as the Internet or the like. Moreover, PCI, PCIe, and other bus protocols might be utilized for embedding the various implementations described herein into other computing systems.

Interpretation of Disclosures Herein

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., browser) on a secondary display, presenting a cursor on a secondary display, presenting controls on a secondary display, and/or generating a control event in response to an interaction on the mobile device or other service. In specific implementations, the controller service may perform portions of methods described herein.

Anticipated Alternatives

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other implementations may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by the processor and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In the foregoing description, for purposes of explanation and non-limitation, specific details are set forth—such as particular nodes, functional entities, techniques, protocols, standards, etc.—in order to provide an understanding of the described technology. In other instances, detailed descriptions of well-known methods, devices, techniques, etc. are omitted so as not to obscure the description with unnecessary detail. All statements reciting principles, aspects, embodiments, and implementations, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed:

1. An autonomous vehicle capable of navigating an operating site, said autonomous vehicle comprising:
    a first sensing system capable of detecting a first visual obstacle;
    a second sensing system capable of peering through the first visual obstacle and detecting a first navigational obstacle obscured by the first visual obstacle such that the first navigational obstacle is undetectable by the first sensing system; and
    a navigation system capable of directing movement of the autonomous vehicle through the first visual obstacle while avoiding the first navigational obstacle.

2. The autonomous vehicle of claim 1, wherein the first sensing system comprises at least one from among a group comprising lidar, RGB imaging, and stereo camera imaging (SCI).

3. The autonomous vehicle of claim 1, wherein the second sensing system comprises at least one from among a group comprising radar and thermal camera imaging (TCI).

4. The autonomous vehicle of claim 1, wherein the second sensing system comprises radar operating within a frequency range no greater than 7.5 GHz.

5. The autonomous vehicle of claim 1, wherein the second sensing system comprises radar operating in a frequency range of between 3.1 GHz to 10.6 GHz.

6. The autonomous vehicle of claim 1, wherein the second sensing system comprises radar operating in a frequency range of between 3.1 GHz to 3.6 GHz.

7. The autonomous vehicle of claim 1, wherein the first sensing system provides a higher detection precision than the second sensing system.

8. The autonomous vehicle of claim 1, wherein the first sensing system provides a detection precision that, when measured in one dimension, is at least eight times greater than the second sensing system.

9. The autonomous vehicle of claim 1, wherein the first sensing system and the second sensing system separately detect a first reference object as a reference point for determining the location of the first navigational obstacle.

10. The autonomous vehicle of claim 1, further comprising a sensing processor for:
    receiving first sensing data from the first sensing system and second sensing data from the second sensing system; and
    determining that the first visual obstacle is not a navigational obstacle to the autonomous vehicle.

11. An autonomous vehicle capable of navigating an operating site, said autonomous vehicle comprising:
    a first sensing system capable of detecting a first visual obstacle;
    a second sensing system capable of peering through the first visual obstacle and detecting a first navigational obstacle obscured by the first visual obstacle such that the first navigational obstacle is undetectable by the first sensing system;
    a sensing processor for receiving first sensing data from the first sensing system and second sensing data from the second sensing system, and determining that the first visual obstacle is not a navigational obstacle to the autonomous vehicle; and
    a navigation system capable of directing movement of the autonomous vehicle through the first visual obstacle while avoiding the first navigational obstacle responsive to the determination of the sensing processor.

12. The autonomous vehicle of claim 11, wherein the first sensing system comprises at least one from among a group comprising lidar, RGB imaging, and stereo camera imaging (SCI).

13. The autonomous vehicle of claim 12, wherein the second sensing system comprises at least one from among a group comprising radar and thermal camera imaging (TCI).

14. The autonomous vehicle of claim 13, wherein the second sensing system comprises radar operating within a frequency range no greater than 7.5 GHz.

15. The autonomous vehicle of claim 14, wherein the second sensing system comprises radar operating in a frequency range of between 3.1 GHz to 10.6 GHz.

16. The autonomous vehicle of claim 15, wherein the second sensing system comprises radar operating in a frequency range of between 3.1 GHz to 3.6 GHz.

17. The autonomous vehicle of claim 16, wherein the first sensing system provides a higher detection precision than the second sensing system.

18. The autonomous vehicle of claim 17, wherein the first sensing system provides a detection precision that, when measured in one dimension, is at least eight times greater than the second sensing system.

19. The autonomous vehicle of claim 18, wherein the first sensing system and the second sensing system separately detect a first reference object as a reference point for determining the location of the first navigational obstacle.

20. An autonomous vehicle capable of navigating an operating site, said autonomous vehicle comprising:
- a first sensing system capable of detecting a first visual obstacle, the first sensing system comprising at least one from among a group comprising lidar, RGB imaging, stereo camera imaging (SCI), and thermal camera imaging (TCI);
- a second sensing system capable of peering through the first visual obstacle and detecting a first navigational obstacle obscured by the first visual obstacle such that the first navigational obstacle is undetectable by the first sensing system, the second sensing system comprising radar operating in a frequency range of between 3.1 GHz to 10.6 GHZ;
- a sensing processor for:
    - receiving first sensing data from the first sensing system and second sensing data from the second sensing system, and
    - determining that the first visual obstacle is not a navigational obstacle to the autonomous vehicle; and
- a navigation system capable of directing movement of the autonomous vehicle through the first visual obstacle while avoiding the first navigational obstacle responsive to the determination of the sensing processor.

* * * * *